United States Patent
McDaniel

(10) Patent No.: US 12,011,835 B2
(45) Date of Patent: Jun. 18, 2024

(54) ENGINEERING AUTONOMOUS SYSTEMS WITH REUSABLE SKILLS

(71) Applicant: Siemens Aktiengesellschaft, Munich (DE)

(72) Inventor: Richard Gary McDaniel, Hightstown, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 440 days.

(21) Appl. No.: 16/648,403

(22) PCT Filed: Sep. 30, 2017

(86) PCT No.: PCT/US2017/054651
§ 371 (c)(1),
(2) Date: Mar. 18, 2020

(87) PCT Pub. No.: WO2019/066979
PCT Pub. Date: Apr. 4, 2019

(65) Prior Publication Data
US 2020/0262073 A1    Aug. 20, 2020

(51) Int. Cl.
*B25J 9/16* (2006.01)
*G05B 19/042* (2006.01)

(52) U.S. Cl.
CPC ........... *B25J 9/1671* (2013.01); *B25J 9/1692* (2013.01); *G05B 19/0426* (2013.01);
(Continued)

(58) Field of Classification Search
CPC ..... B25J 9/00; B25J 9/16; B25J 9/1656; B25J 9/1671; B25J 9/1679; B25J 9/1692;
(Continued)

(56) References Cited

U.S. PATENT DOCUMENTS 9,197,810 B2   11/2015   Troy et al.
9,855,103 B2   1/2018    Tsekos et al.
(Continued)

FOREIGN PATENT DOCUMENTS

| CN | 104780849 A | 7/2015 |
| CN | 105518486 A | 4/2016 |
| EP | 2263837 A1 | 12/2020 |

OTHER PUBLICATIONS

International Search Report dated Jun. 14, 2018; Application No. PCT/US2017/054651; 12 pages.

*Primary Examiner* — Khoi H Tran
*Assistant Examiner* — Sarah A Tran

(57) ABSTRACT

A computer-implemented method of engineering autonomous system with reusable skills includes displaying a graphical user interface simulating a physical environment. The graphical user interface depicts one or more simulated objects corresponding to one or more physical objects. Graphical markers are created on the simulated objects based on instructions provided by a user via the graphical user interface. The position and orientation of each graphical marker is determined with respect to the simulated objects. A skill function is created which comprises a functional description for using a controllable physical device to interact with the physical objects based on the position and orientation of each graphical marker. Executable code operable to perform the skill function is created and used to actuate the controllable physical device.

14 Claims, 28 Drawing Sheets

(52) U.S. Cl.
CPC .............. *G05B 2219/36017* (2013.01); *G05B 2219/40126* (2013.01); *G05B 2219/40527* (2013.01)

(58) Field of Classification Search
CPC ........ G05B 19/00; G05B 19/02; G05B 19/04; G05B 19/042; G05B 19/0426; G05B 2219/00; G05B 2219/30; G05B 2219/36; G05B 2219/36017; G05B 2219/40; G05B 2219/40126; G05B 2219/40527; Y02P 90/00; Y02P 90/02
USPC ........................................................ 700/245
See application file for complete search history.

(56) References Cited

U.S. PATENT DOCUMENTS

| | | | |
|---|---|---|---|
| 2002/0186245 A1 | 12/2002 | Chandhoke et al. | |
| 2003/0120391 A1* | 6/2003 | Saito .................... | G05B 19/425 |
| | | | 700/264 |
| 2011/0010009 A1* | 1/2011 | Saito .................... | B25J 9/1612 |
| | | | 703/13 |
| 2014/0316566 A1* | 10/2014 | Mazel .................... | G06N 3/008 |
| | | | 700/250 |
| 2015/0239127 A1* | 8/2015 | Barajas .................. | B25J 9/1671 |
| | | | 700/253 |
| 2018/0107969 A1* | 4/2018 | Trivelpiece ............ | B25J 9/1679 |

\* cited by examiner

WType
string m_strName
enum m_type { INT, FLOAT, BOOL,
 STRING, ITEM, ASSET, ENUM,
 FIELD, STRUCT, ARRAY,
 CHOICE, ANY, NONE, CLASS }
WType[] m_arrSubType

WProp
WType* m_pType
string m_strName
bool[] m_flags

WClass
string m_strName
{int,int,int} m_version
WClass* m_pInherits
WProp[] m_arrProperty
IWItemExec* m_fnClass
IWRunFactory* m_fnFactory bool IsA (const WClass&) const
WItem* Instance () const

*Fig. 7*

```
WValue
enum Type m_type
int m_nSize
union {
  int, float, string, item,
  asset, run_obj, value[],
  class
}
```

```
WItem
WClass* m_pClass
WValue[] m_arrValue
```

Fig. 8

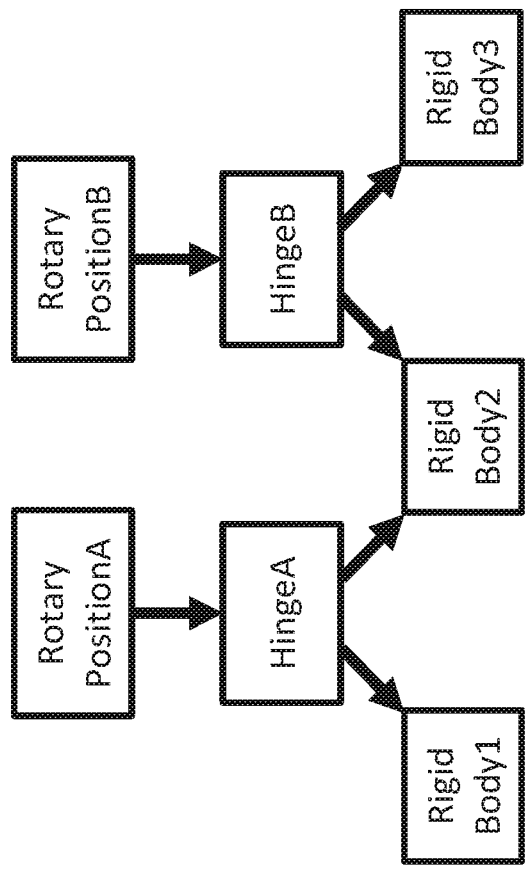
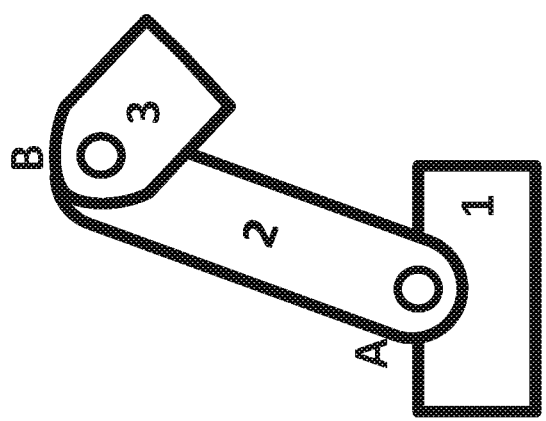
*Fig. 12*

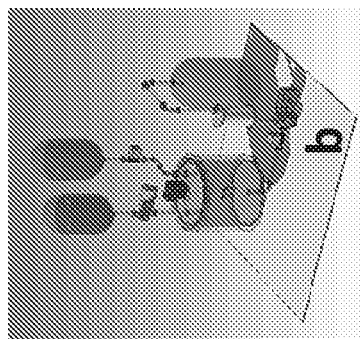
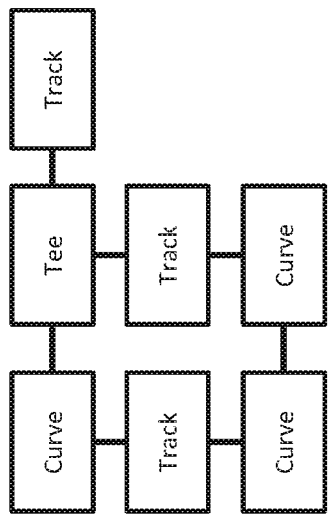
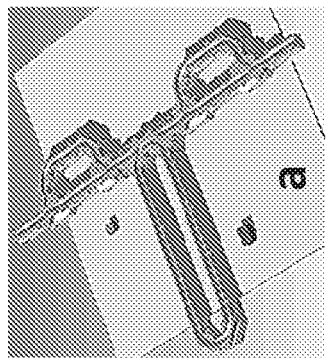
Fig. 15

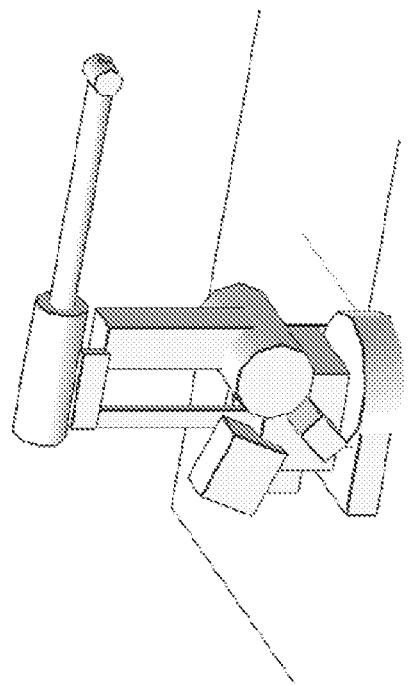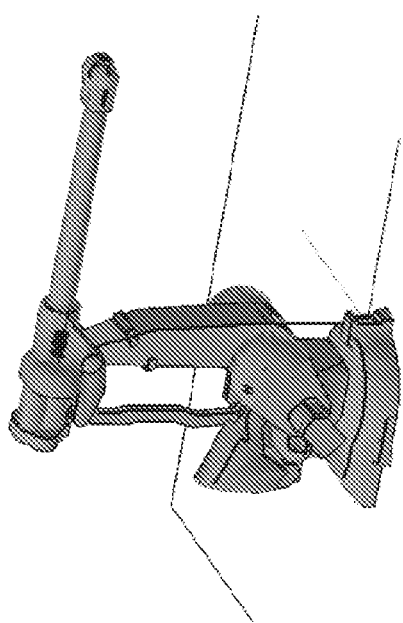
Fig. 17

```
Expression Language (partial)
    <locals> ::= <param> *
    <param> ::= <string> ':=' <expr>
    <expr> ::= <constant> | <binary_expr> | <unary_expr> | '(' <expr> ')' | <method_call> | <property_get> | <parameter> | <property_get> | <select> | <struct_field> | <array_ref>
    <constant> ::= <string> | <int> | <float> | <bool> | <item_ref> | <property_id> | <array> | <struct> | 'self'
    <binary_op> ::= <expr> <binary_op> <expr>
    <unary_op> ::= <unary_op> <expr>
    <method_call> ::= <expr> '.' <property_id> '(' [ <expr> { ',' <expr> } ] ')'
    <property_get> ::= <expr> '.' <property_id>
    <select> ::= 'Select' <expr> 'with' <expr>
```

Fig. 22

ENGINEERING AUTONOMOUS SYSTEMS WITH REUSABLE SKILLS

CROSS-REFERENCE TO RELATED APPLICATIONS

This application is a national phase filing under 35 U.S.C. § 371 of International Patent Application No. PCT/US2017/054651, filed Sep. 30, 2017, which is incorporated herein by reference in its entirety.

TECHNICAL FIELD

The present invention relates generally to methods, systems, and apparatuses for engineering an autonomous system with reusable skills. The technology described herein may be applied, for example, to various integrated product design, engineering and manufacturing tools and other produce lifecycle management and machine programming applications.

BACKGROUND

Traditional programs use hand-crafted, low-fidelity representations of the environment in which they operate. The programmer is entirely responsible for drafting the data structures that represent the world of the devices and all the state that is needed internally to make the device operate. They are also responsible for writing code for each action and conditional test that the application program performs in detail. As a consequence, the world representation and program code are written as minimally as possible, both because time is precious and to reduce the amount of code that needs to be tested. This prevents algorithms from reading the world state in a general way and is generally an impediment to creating autonomous systems.

A typical programming method might be to represent the actuators and sensors as a list of numeric values. These values could be programmed to change in time by reading values from a table and writing out to the values that need to be changed. The table of values over time becomes the program of the device. More advanced functions will use numeric values of sensors to pick different sets of values to be applied based on the values of the inputs. For example, the selection of a switch may cause the machine to use one table of values when it is on and use a different table when the switch is turned off. In order to generate the table of time synchronous values, the programmer may move the device manually, putting the device into different poses and recording the joint positions. The recorded positions are stored as the values for the table and then are replayed to make the device move in a similar fashion when it is run.

Focus on the Input and Output values (I/O) is common in many automation programming languages. The I/O values themselves do not reveal the context or purpose of anything the device does. For a simple, reflex-like behavior, this can be sufficient, but it does not allow the device to take action based on more complicated needs. An autonomous system needs to be able to reason about its own state as well as the state of its environment to be able to plan its activity and take actions accordingly. As such, internal representations, such as models for the device and the objects in the environment that affect the course of the automation need to be considered. In a traditional programming environment, the programmer will hand write a custom solution for every problem. Data are represented as disassociated groupings of numbers and character values according to the whim of the developer. When using a library, such as a planning system, each library will have its own method for representing the data over which it processes. The developer must translate the data in the application's custom data structures manually for each algorithm in the library and translate the library's data formats back into the custom data structure to interpret the result.

SUMMARY

Embodiments of the present invention address and overcome one or more of the above shortcomings and drawbacks by providing methods, systems, and apparatuses related to engineering autonomous system with reusable skills. A primary factor differentiating the techniques described here from the techniques of conventional modeling systems is the use of explicit physical modeling and multi-function markers in conjunction with ordinary functional methods to achieve automation programming. The physics modeling and markers are part of the programming language and contribute directly to the semantics of how the automation behavior works.

According to some embodiments, a computer-implemented method of engineering autonomous system with reusable skills includes displaying a graphical user interface simulating a physical environment. The graphical user interface depicts one or more simulated objects corresponding to one or more physical objects. Graphical markers are created on the simulated objects based on instructions provided by a user via the graphical user interface. The position and orientation of each graphical marker is determined with respect to the simulated objects. A skill function is created which comprises a functional description for using a controllable physical device (e.g., robot arm) to interact with the physical objects based on the position and orientation of each graphical marker. Executable code operable to perform the skill function is created and used to actuate the controllable physical device.

In some embodiments, the aforementioned method further includes generating a plurality of process objects comprising (i) process objects corresponding to the physical objects; (ii) process objects corresponding to the controllable physical device; (iii) process objects corresponding to the graphical markers; and (iv) process objects corresponding to the skill function. In one embodiment, the process objects are used as prototypes for a plurality of runtime objects and the executable code is derived from the runtime objects. In another embodiment, the process objects corresponding to the controllable physical device comprise a device object and a plurality of sub-objects organized in an owner part hierarchy. The executable code may then traverse the owner part hierarchy to actuate the controllable physical device. In other embodiments, the device object and a plurality of sub-objects are linked using connections corresponding to kinematic function. The executable code may then use the connections to actuate the controllable physical device. In other embodiments, the process objects are organized in an attachment hierarchy based on physical attachment. The executable code may traverse the attachment hierarchy to actuate the controllable physical device.

According to another aspect of the present invention, a second computer-implemented method of engineering autonomous system with reusable skills includes identifying graphical markers placed on simulated objects in a simulation environment. Each simulated object corresponds to a physical object in a physical environment. Position information for each graphical marker in the physical environment is determined based on the graphical marker's position within the simulation environment. Executable code for controlling a physical device is generated using a plurality of skill functions. Each skill function provides a functional description for the physical device operating in the physical environment based on the position of each graphical marker. Additionally the executable code may be used to actuate the physical device.

The aforementioned second method may be used to interact with the physical environment in a variety of ways. For example, in some embodiments of the aforementioned second method, position information from at least a portion of the graphical markers is used to calibrate the robotic arm to the physical environment. In other embodiments, at least a portion of the graphical markers comprise touch markers indicating where the physical device should touch a particular physical object during execution of one or more of the skill functions. In still other embodiments, at least one physical object corresponds to a handle and at least one of the graphical markers corresponds to a position for actuating the handle using the physical device during execution of one or more skill functions.

Various graphical components may be used for representing the markers in the aforementioned methods. For example, in one embodiment, at least one of the graphical markers comprises an arrow indicating direction of travel for the physical device during execution of one or more skill functions. In another embodiment, at least one of the graphical markers comprises a circle indicating a destination of the physical device following movement during execution of one or more skill functions.

In other embodiments, a computer-implemented method of engineering autonomous system with reusable skills includes activating a skill function as part of a device service. The skill function comprises one or more functional steps to be performed on a physical object in a physical environment. Structural information is collected from the physical environment and used to identify the physical object. Markers corresponding to the physical object are retrieved from a database of pre-generated markers. Then, a physical device is used to perform the functional steps on the physical object using the markers.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings exemplary embodiments that are presently preferred, it being understood, however, that the invention is not limited to the specific instrumentalities disclosed. Included in the drawings are the following Figures:

FIG. 7 provides an illustration of a WClass and related objects that may be used in some embodiments;

FIG. 8 shows a WItem that holds the prototype data for a particular World Model object, as may be used in some embodiments;

FIG. 12 shows how kinematic joints and controllers can define their own hierarchy;

FIG. 15 shows how track connection modeling may be performed in some embodiments of the present invention;

FIG. 17 shows two multiple surface representations for an object: one for display and the other for collisions;

FIG. 22 shows a partial expression language that might be used for computation in skill functions;

DETAILED DESCRIPTION

The following disclosure describes the present invention according to several embodiments directed at methods, systems, and apparatuses related to engineering autonomous system with reusable skills.

As a general rule, it is easier to know what is desired but much less easy to know how to achieve that goal. A traditional programming language requires the programmer to describe an algorithm using terms that are much more fundamentally simple than the problem that one is trying to solve. There is no obvious relationship, for example, between the need to express an iteration loop using a "for" statement and the need to find all the boxes in the storehouse and make a pile. A for-loop is a low-level, mathematical concept; whereas, fetching boxes is a high-level, human concept. For the programming with skills concept, one starts from the standpoint of graphical editing and build on top. Programmers generally know what they want the device to do and the attributes of how the job should be accomplished but are less likely to know how to accomplish the task or know how various implementation choices will interact with each other. So, a large part of the programmer's task is selecting and arranging the elements of the application in much the same way as performed in a simulation tool.

Figure 1:
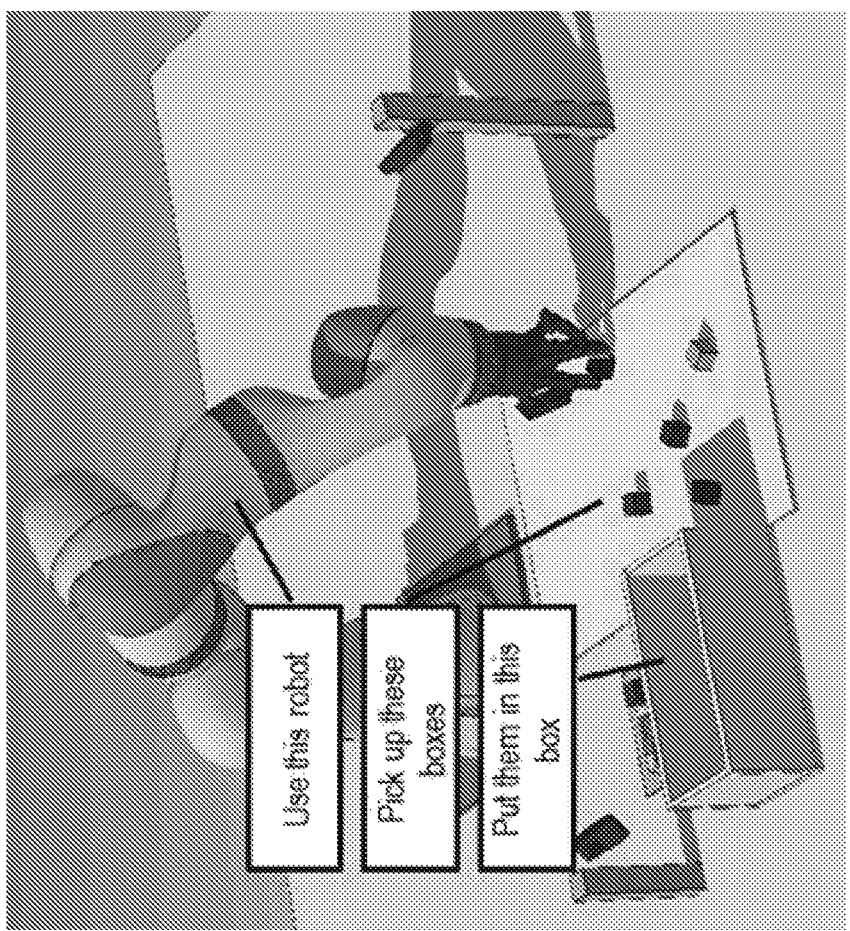
FIG. 1 illustrates an example of using a high-level goal-oriented language to specify application function.

FIG. 1 shows an example of using high-level goal-oriented language to specify application function. In this example, the programmer might want to pick up a set of objects and sort them into bins. The "program" for this application would comprise the robot, cameras, and any other active device. Plus, it would contain the passive objects like the work pieces, jigs, and containers. Further, one would want the activity to be specified just as generically as denoted in the figure. It would be as close as possible to just "pick items up" and "drop items here." The majority of the actual programming in this case would be determining the correct selection of objects to affect.

The actions of the devices are specified by the programmer as "skills." Skills are somewhat like functions; however skills have both a functional as well as a structural component. Skills are derived for higher-level abstract behaviors centered on how the environment is to be modified by programmed physical devices. Examples of skills that may be implemented using the techniques described herein include a skill to open a door, a skill to pick up parts, or a skill to sort fruit. A skill is designated by activating it as a function within the programming environment. This may be performed, for example, by calling the skill as part of a device service. Once activated, the skill reads out structural information from the physical environment to determine its operation. For example, it will search for physical objects to be picked up and use a "Pick Up" marker on that object to determine the grip and reach orientation and pressure. Graphical markers placed on the world's context objects search for critical information and generate the paths and other data needed by the device to determine its actual behavior.

For graphical markers, the usual situation is that a particular functional command would be displayed graphically using some kind of marker. If the system provided the ability to manipulate the marker, this would have the effect of changing the parameterization of the command. Using the techniques described herein, the markers are independent objects from their use in functions. A given marker and the objects to which it is attached could be used for many different functions depending on the current state of the application. A door handle marker could be used to open a door for one function and close a door for another. It could also be used to measure the space that a door would take when it is opened. The touch markers may be created independently by the developer and in this case are used to represent where to touch the conveyor. The same markers can also be used by another function to read out calibration values such as to find where to place the object representation of the work piece. A given function can also use different sets of markers depending on context. A different set of markers could be created to touch and calibrate to a different object. For example, the device might touch the laser cutter to calibrate its position. In this case, the same function is applied to different markers to achieve a different effect.

Figure 2A:
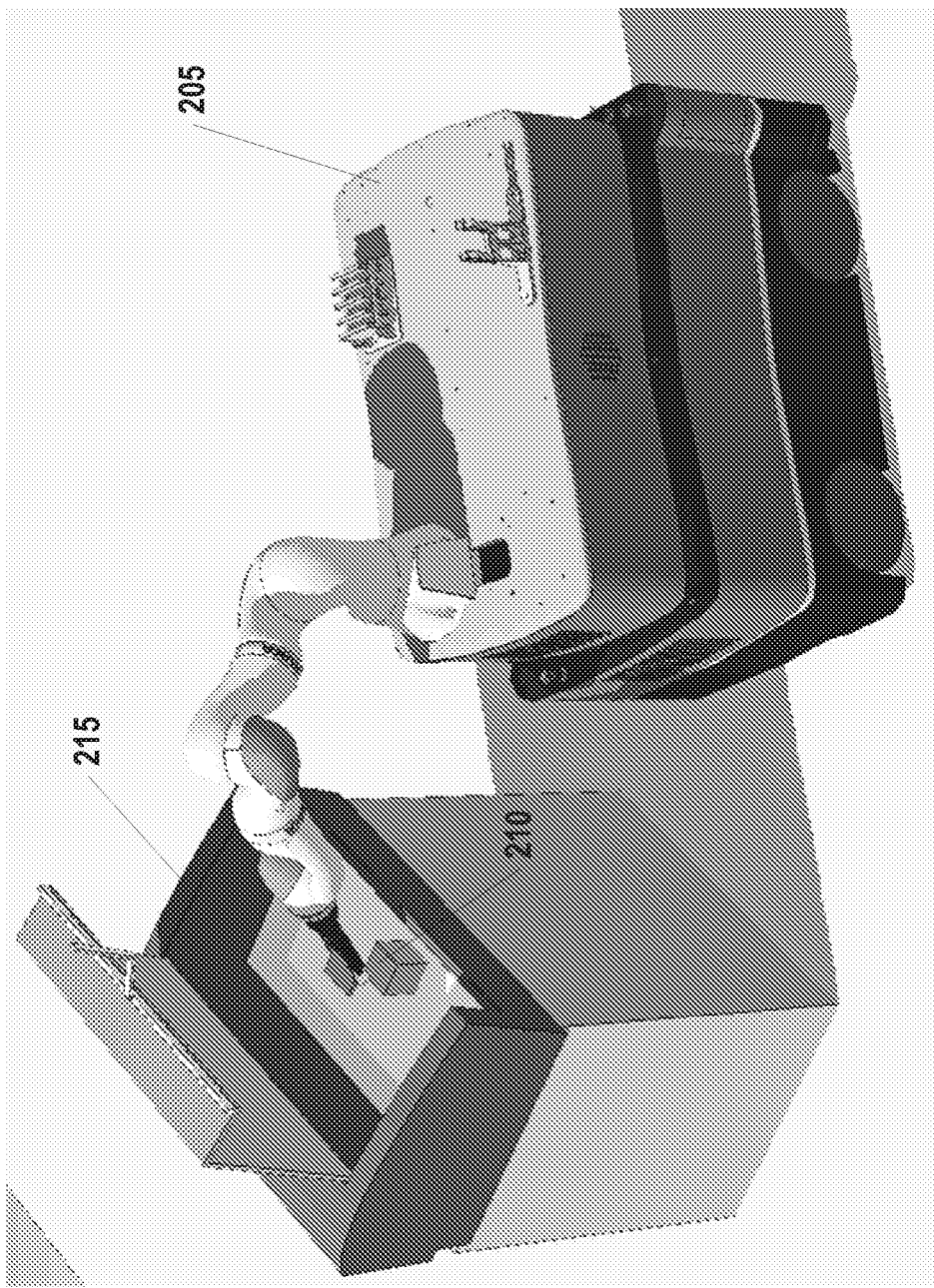
FIG. 2A shows an example machine tending example, as may be implemented in some embodiments.
Figure 2B:
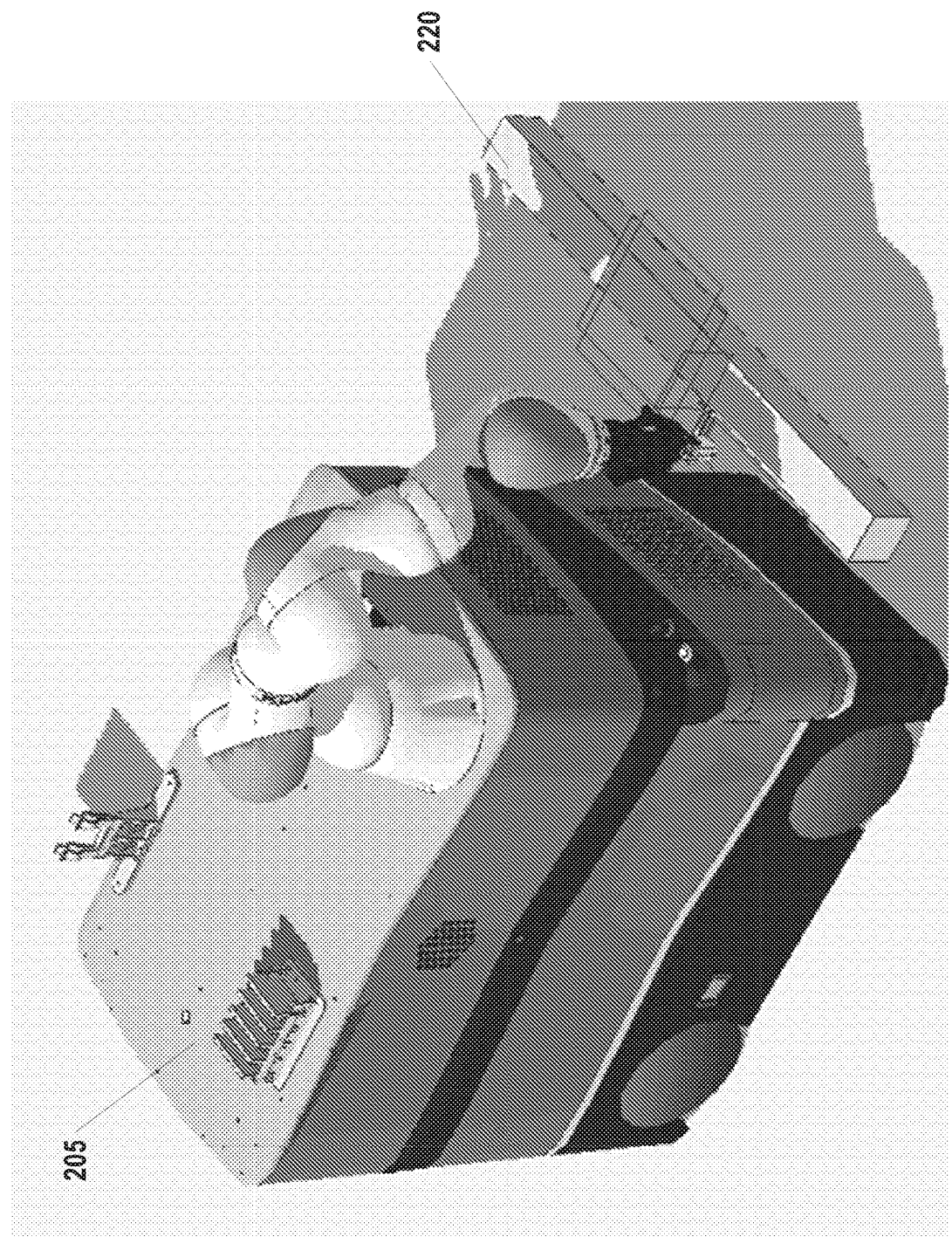
FIG. 2B shows an example of calibrating work part location by touching a conveyor.
Figure 2C:
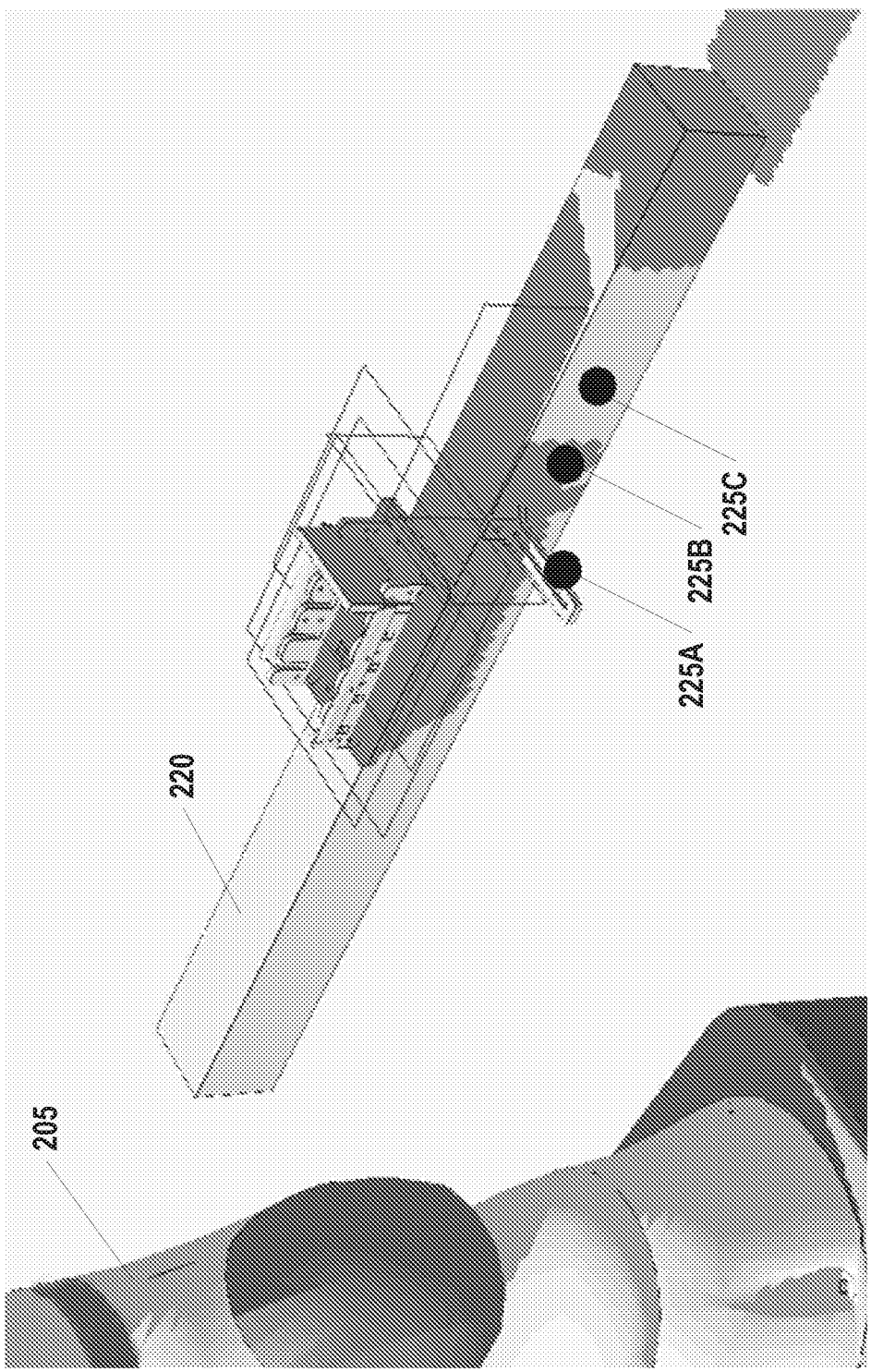
FIG. 2C provides an additional view of the example shown in FIG. 2B.

FIGS. 2A-2C show an example of using a skill to implement a machine tending application, according to some embodiments. The robot 205 shown in FIG. 2A will pick up work pieces 210 from a conveyor and deposit them into a laser cutter 215 for processing. In order to pick a work piece from the conveyor 220 shown in FIG. 2B, the robot 205 must touch the conveyor 220 lightly to calibrate its position with respect to the work piece. FIG. 2C shows the view of the conveyor 220 from the perspective of the robot 205. In this example, the robot 205 touches the three touch points 225A, 225B, 225C. This is a sufficient sampling to determine the 2D orientation and position of the work piece parallel to the floor. The three touch points 225A, 225B, 225C can later be retrieved to compute the exact position of the bar being touched and by proxy the position of the work piece.

Figure 3:
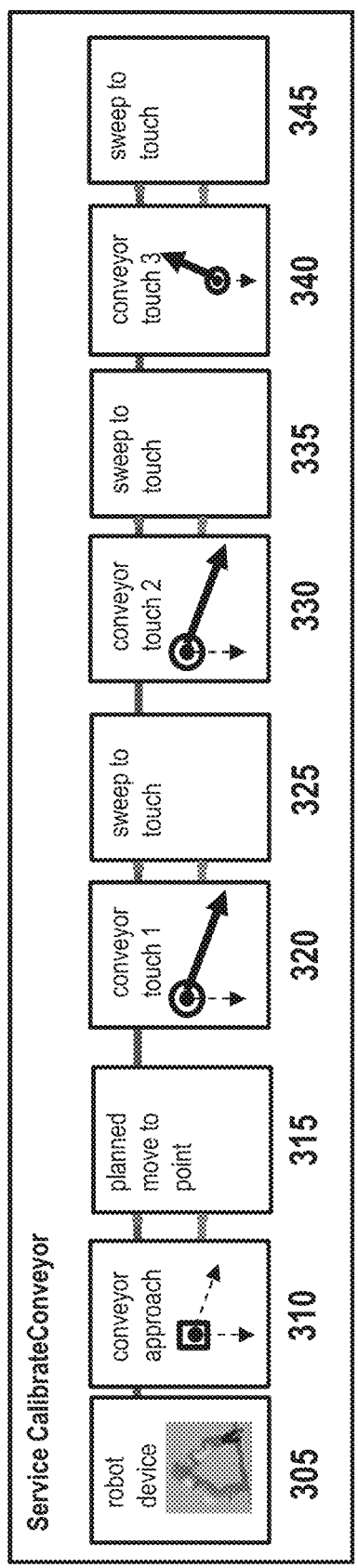
FIG. 3 provides an example functional description for calibrating work piece position, according to some embodiments.

FIG. 3 shows a description of a skill function for calibrating work piece position, as it may be implemented in some embodiments of the present invention. Here, the skill is performed by robot device 305. The skill function description makes reference to markers in the physical space surrounding the devices. Here there are four markers 310, 320, 330, and 340. Marker 310 denotes the conveyor, while skill markers 320, 330, and 340 correspond to touch points on the conveyor. Using the conveyor mark 310, a planned move to point operation 315 is performed to move the robot into position. To perform a touch operation, the robot must position the end effector nearby the surface and then slowly move toward the surface until the touch is made. This is shown by the "sweep to touch" actions 325, 335, and 345.

Figure 4:
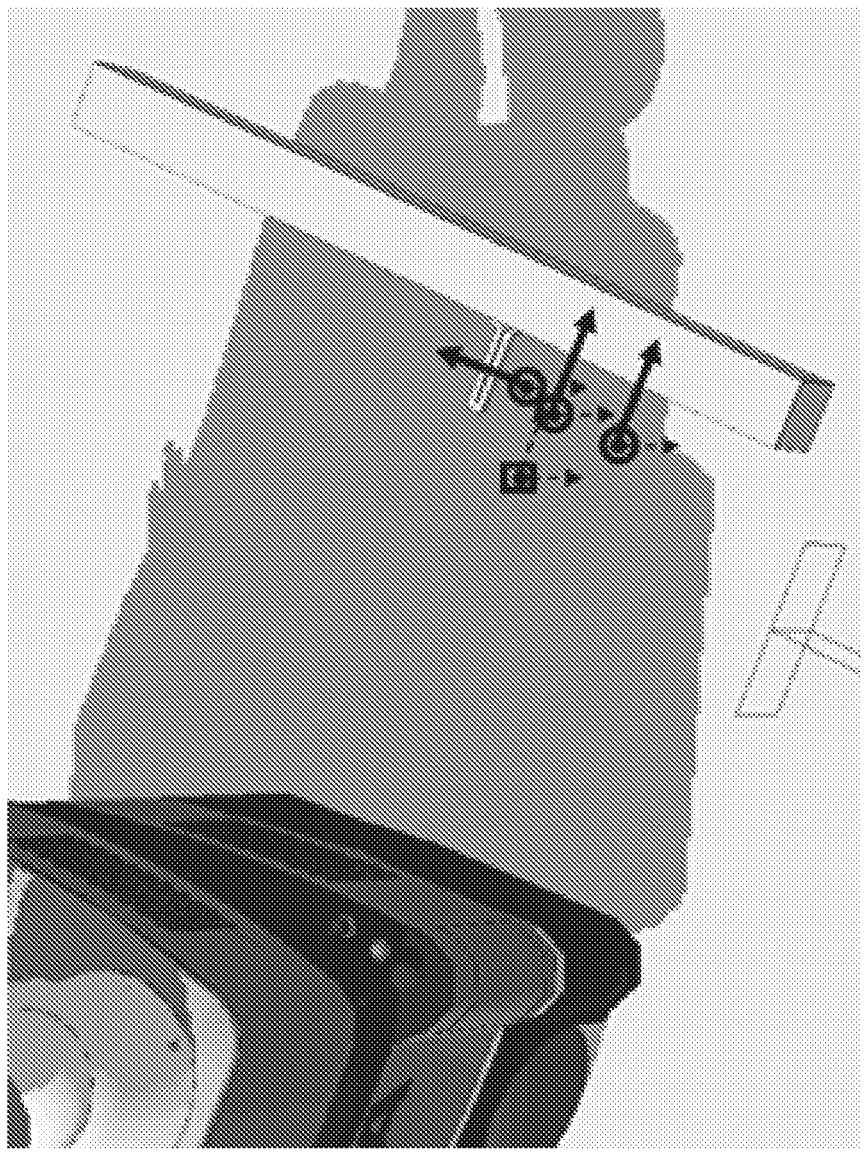
FIG. 4 illustrates how skill markers can be used for directing the touch operations.

FIG. 4 illustrates the placement of skill makers on a visual representation of the conveyor belt. This placement supplements the functional description of the skill shown in FIG. 3. The programmer places the skill markers into the representation of the physical context of the device. The position and orientation as well as other factors are read into the skill functions and determine how the functions proceed to actuate the devices. The markers include calculated attributes such as positions of surfaces, kinematic joints, and other factors that come from searching the objects in the surrounding context. Skill functions may make use of particular markers to generate actions or it may determine which markers to apply based on its own calculations.

Implementing skills for autonomous automation leaves the programmer with many options. The following sections detail an example implementation for the object system and kinds of objects that could operate within the system. Many of the low-level features could be implemented using different forms but would maintain the overall function of the described libraries.

In some embodiments, skills for autonomous automation are implemented using a language independent meta-model. The basis for skills, components, and all the other features is a World Model that comprises objects derived from classes as in an object-oriented model. The World Model forms the basis of implementing all the processing objects as they are coded in whatever language and operating system the controller provides. The World Model is intended to be language independent; thus, it is expected that one can create, inspect, modify, and delete world objects in many kinds of programming environments from, for example, C++ on Linux to Relay Ladder Logic (RLL) on a Programmable Logic Controller (PLC). Additionally, one can define new classes in arbitrary environments as well; though, in practice, some languages may be too idiosyncratic and special purpose (e.g., SQL) for this to occur.

Figure 5:
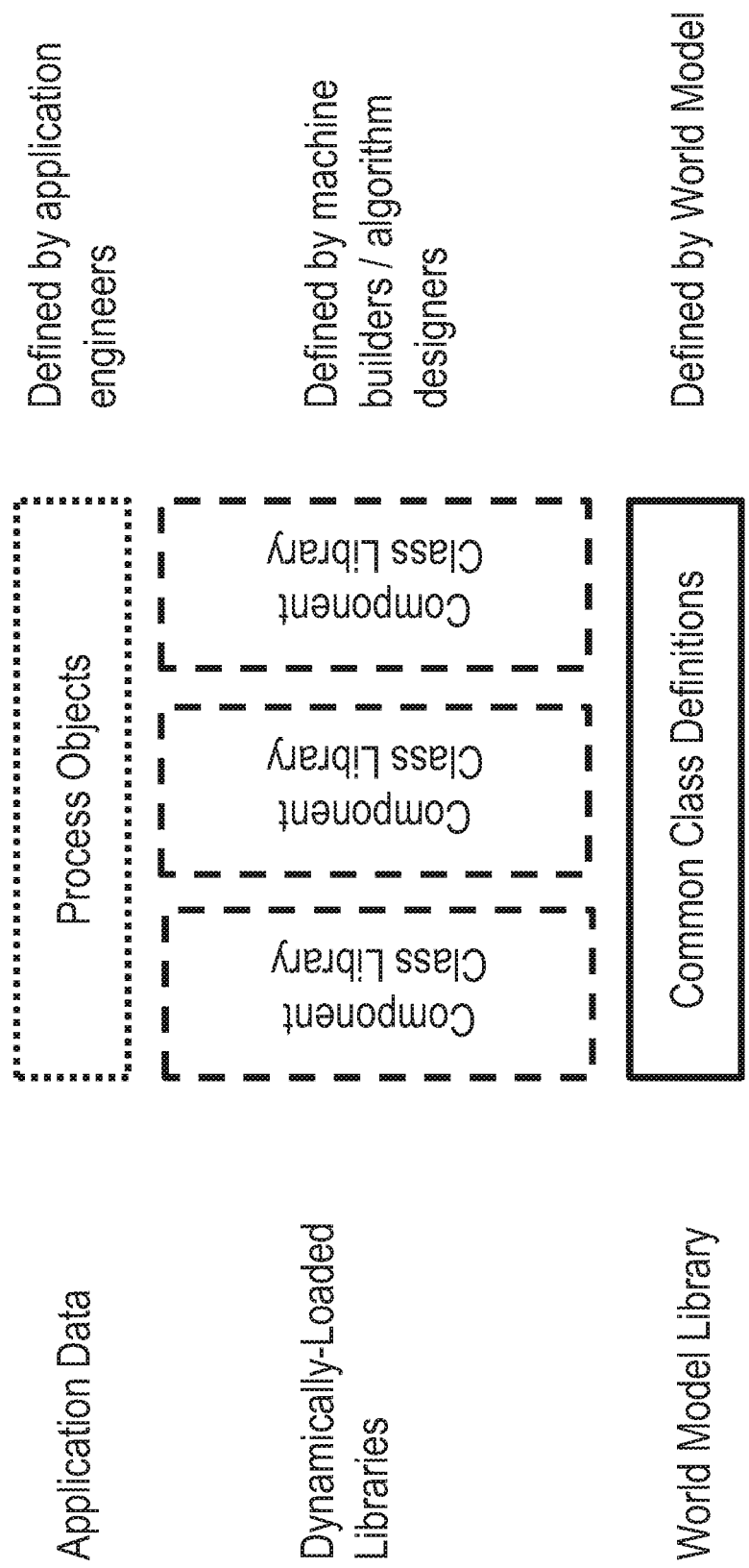
FIG. 5 shows an example implementation hierarchy for World Model objects and classes.

The World Model is implemented as a hierarchy of libraries that define World Model classes from which the process objects are derived and is shown in FIG. 5. The World Model begins with common library (labeled "Common Class Definitions in FIG. 5) that defines all the fundamental operations for interacting in the given environment. The common library also defines all the base classes from which other classes are derived. On top of the base definitions are a set of dynamically-loaded libraries that are created by the machine builders as well as designers who implement special algorithms such as what might be found in skills. The libraries are each generically termed Component Class Library, although they are used to define more than just physical hardware components. The component libraries are where machine builders and algorithm designers implement their domain-specific knowledge. For example, this is where the implementation for a specific robot would reside within the hierarchy. The component libraries are also a major element of customization. Different users can install different component libraries depending on the domain and context of their application.

Continuing with reference to FIG. 5, the application itself is defined at the top of the stack. These are data objects instantiated from the classes defined in the component libraries. All the objects are considered part of the application's "code" and comprise objects representing both physical and logical elements. The objects represent machines, sensors, actuators, markers, and work pieces, as well as skills, circuits, and services. The process objects are defined by the application engineer who might use the engineering tool as a high-level way to instantiate, visualize, and construct these objects. Using a specialized engineering tool, however, is not required. It is equally possible to instantiate process objects by writing out code such as in an executable application that creates the objects manually and parameterizes the objects to be in the right configuration. This method is especially useful in that there are a large number of objects to configure whose values can be determined algorithmically.

A process object can be "run" in the sense that it has library code from its component library that runs and uses the runtime state of the process object to determine what it actually does. The application's process objects run in the controller's runtime and in an engineering tool's simulator using the same set of objects and component libraries. However, the component library for runtime will differ from a component library in a simulator in that they will implement their machine operations differently. On the runtime, the component library connects to and controls the actual machine. In the simulator, the component library creates simulation objects and controls the state of the simulation.

Figure 6:
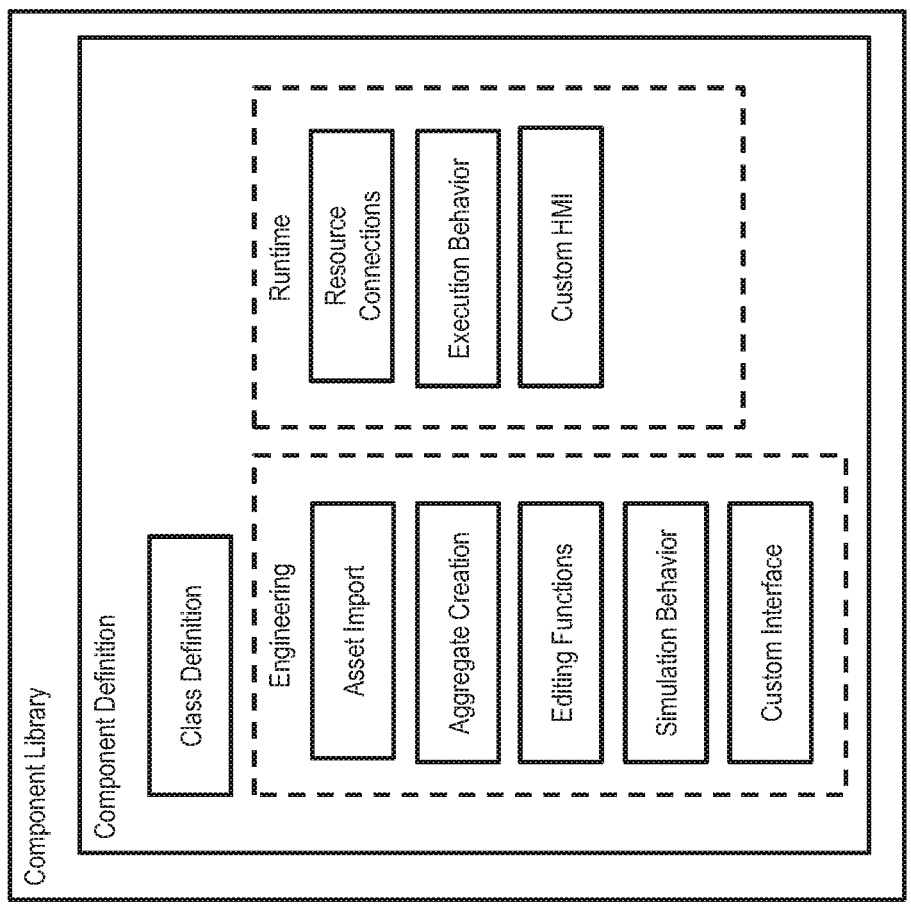
FIG. 6 illustrates the contents of a Component Class Library that may be used in some embodiments.

FIG. 6 shows the structure of a Component Class Library, according to some embodiments. Inside the library is a set of one or more component definitions. Note that the "component" does not need to be a machine; for example, the component may alternatively be a skill. Within a component, the class definition determines what properties an object of this component type will contain. The definition also contains the component's implementation. A Component Library will have an implementation suited to its context. For a high-level engineering system with simulation, the Component includes an Asset Import module that defines what 3D models the component imports, an Aggregate Creation module that creates simulation objects as sub-objects to make an aggregate, an Editing Function module that supplies special editing functions like resizing handles, and a Simulation Behavior module defines simulation behavior. In some embodiments (including the one shown in FIG. 5), a Custom Interface module defines interfaces to relevant functionality (e.g., a camera viewer). For runtime, the Component includes a Resource Connections module that creates I/O such as network connections to the physical machine, an Execution Behavior module that defines execution behavior to control the machine's state and, in this example, a Custom Human Machine Interface (HMI) module that defines other custom HMI visualizations.

As a prototype, a C++ library was written to define and implement the meta-model of the World Model classes, types, and instances. The meta-model will be present herein as a kind of C++-like pseudo-code. Methods are indicated by function call parentheses "( )", array types are shown with square brackets "H", and pointers are shown with asterisk or ampersand, "*" or "&" with the usual semantics. The basic class definition is shown in FIG. 7 and is called WClass. It shows that an object will comprise a list of property values (name, value pairs) as is seen in many object systems. For the class that is defining the type, not the value, the list is of name, type pairs. The class supports single inheritance as shown by the m_pInherits member. Of particular importance, the value of a property is allowed to be a reference to another object. This is a key principle that allows for the structuring of objects as shown in the next section.

The WItem shown in FIG. 8 holds the prototype data for a particular World Model object. An item is instantiated from a class via the Instance method and its properties are populated with the initial data from which the application will start. The WItem is not the final instance that is used to represent a running object. It is the object produced by engineering, one of the process objects. Its values are used to represent static structures and property values that do not change at runtime as well as the initial value for properties that do change at runtime.

Figure 9:
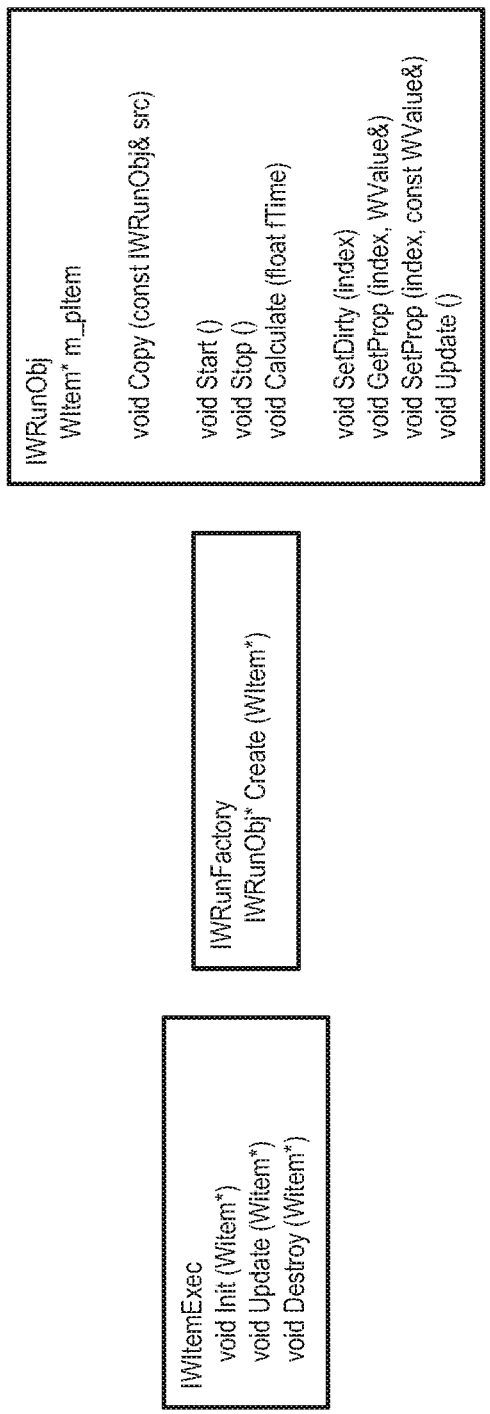
FIG. 9 illustrates the interfaces defining library implementation for objects, as may be used in some embodiments.

The WItem is mostly a data object, the actual code that runs things are managed as interfaces whose implementations fill the component libraries. Three of the main interfaces are shown in FIG. 9. The interfaces are managed as classes in the implementation language (like C++ classes). The developer can subclass the desired interface and make a custom implementation. In this case, the developer would be the machine builder or advanced algorithm designer. The runtime object and item code becomes the "real" implementation for the World Model Object, internally. Typically, runtime objects will refer to one another by pointers to the runtime object implementations. This is why the WItem objects typically do not need explicit methods; such calls are handled at the runtime object level.

The IWItemExec methods are called on WItem instances when they are created, updated (property change), and destroyed. These methods are used to set up the contents of the instance such as filling in needed sub-structure like simulation objects. The IWRunFactory and IWRunObj are used to create the runtime version of World Model objects. Since the WItem version is the static prototype, the IWRunObj or just runtime object is the implementation that does the real runtime work for the object. In this case, runtime refers to any situation where the object is being run whether it is in a simulator or if it is in the controller runtime. The runtime object will be unique and have separate state for each real object being operated upon. For example, a vision system may "see" a set of work pieces that need to be picked up. The work piece instance in the application is a WItem. Each work piece that the vision system sees is an IWRunObj, one for each piece.

Figure 10:
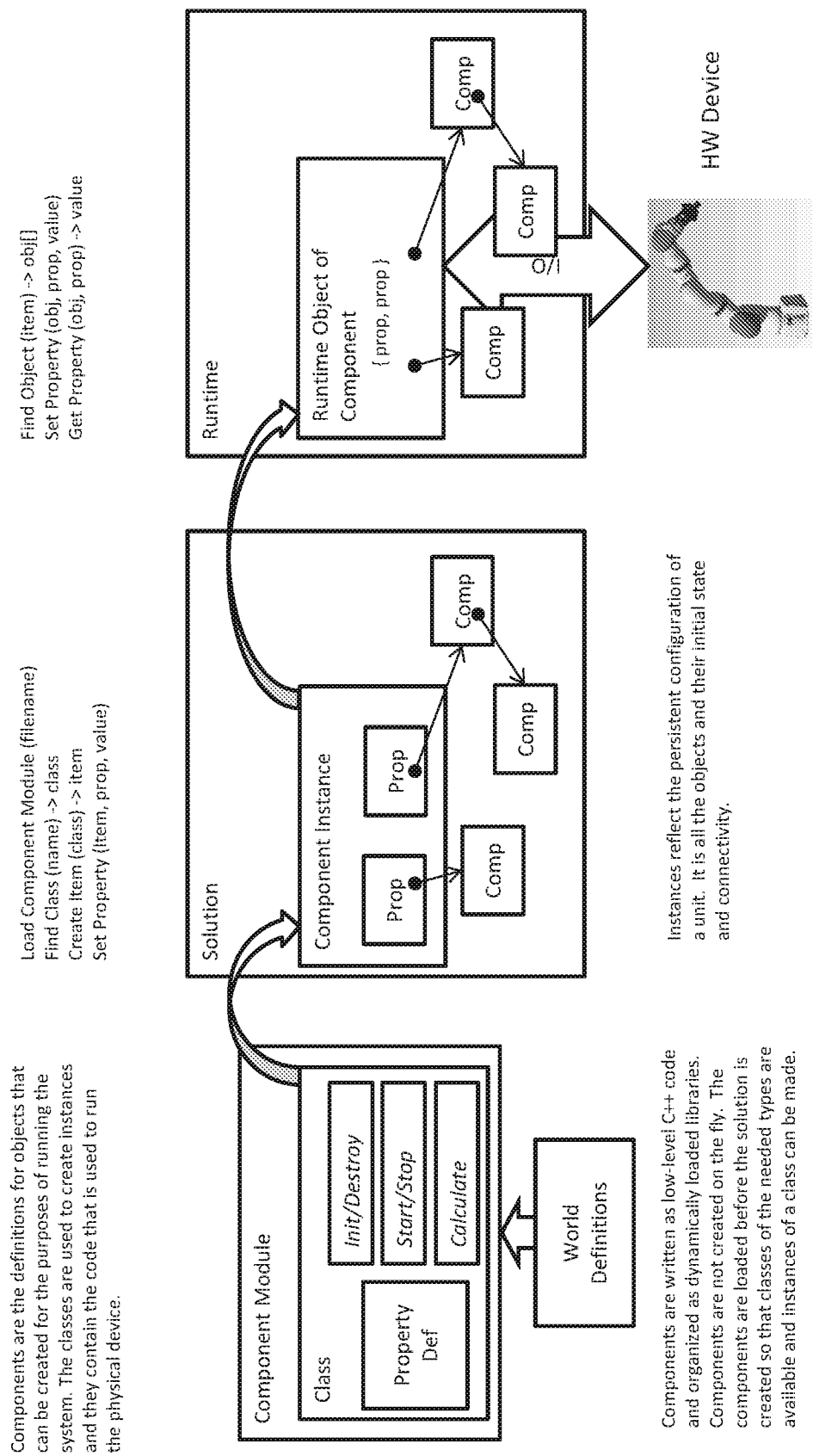
FIG. 10 provides a summary of how objects are produced and run in the World Model, according to some embodiments.

FIG. 10 shows the fundamental parts of the World Model and how they work together, according to some embodiments. The machine builder or advanced algorithm designer writes code in component class libraries that define the kinds of World Model objects the application engineer can make. The library defines the content of the object itself as well as the code that implements the object's function. The application engineer selects which kinds of objects are used to build the unit including devices, work parts, skills, and so forth depending on the application function. These form the process objects and can be run in simulation or be transferred to run on the controller. Running the application creates runtime objects that use the process objects as prototypes and instantiate the interfaces defined in the class library. The runtime objects make connections to the real machines and manage the runtime data of the application.

The structure of process objects is enabled by the ability for objects to contain references to one another. Given one object as a starting point, perhaps a reference to a robot object, one can follow connections to other objects that are semantically related. From the robot, one might go to the gripper attached to the robot, or one might dive into the constructs of the robot to find out its axis positions. A still deeper dive into the robot might reveal its rigid body structure or its moving collision surfaces.

Though technically, a component library writer can introduce any kind of referential structure that is desired, the system of objects that have been defined for the use cases support four kinds of default connectivity. These may be supported directly in the graphical editor of the engineering tool and allow the application engineer to create and inspect connections of these types in a straightforward fashion.

Providing a generic grouping mechanism is a common and useful feature. In the object model, this is referred to herein as an "owner part hierarchy," and the basic idea is that an object can be the owner of a number of sub-objects who themselves can be an owner of further sub-objects. In this case, objects are not repeated; an object can be a sub-object of only one owner. Objects that can be an owner will supply a "parts" property to store the list of sub-objects and each object that can be a sub-object will have an "owner" property to be the back pointer.

Figure 11:
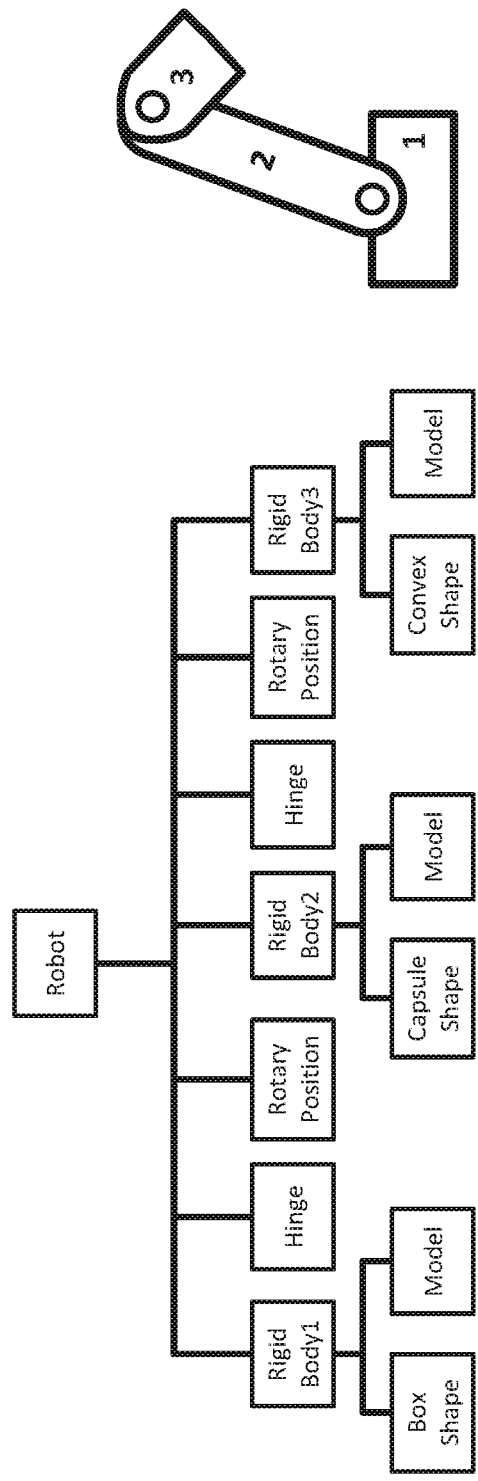
FIG. 11 illustrates a part-owner hierarchy for a robot-like device.

Owner-part grouping is most commonly used to aggregate a device object with sub-objects that provide more specific information about its function. For example, a robot will be created as an "Assembly" that is a generic grouping class. The sub-parts of the robot might be instances of "Rigid Body" to represent moving parts and instances of "Hinge" to represent the rotary points of motion. One of the robot's rigid bodies might contain a "Capsule Shape" to represent its collision surface, as well as a "Model" to represent the 3D graphical appearance of that part of the robot. An example part-owner hierarchy for a robot-like device is shown in FIG. 11.

For physical positioning, an owner-part may be used to provide scene graph style stacking of position and orientation values. All objects within an assembly are positioned relative to the assembly. All objects within a rigid body are positioned relative to the rigid body. This helps to simplify positioning data for objects to be easily copied and transformed to different locations.

A part hierarchy may also be used to store sub-skills in skills; however, in this case, skills are allowed to be used and re-used in multiple contexts. So, the uniqueness of the owner-part relationship is broken. Marker objects are members of skills and are also members of the owner-part hierarchy of the physical space. A given marker is unique in the physical space but can show up multiple times in skills.

Aggregation is only one method for organization available for objects inhabiting physical space. Another major semantic that needs to be specified are physical connections otherwise known as kinematics. Many systems mistakenly conflate scene graph relationships with kinematic relationships. However, this only works if the connections between moving entities do not form a loop. Since our system allows for arbitrary references to other process objects, creating a proper kinematic graph is not an issue.

FIG. 12 shows an example of how kinematic joints and controllers define their own hierarchy, as may be implemented in some embodiments. In this example, the physical objects are arranged and connected according to their kinematic function. At the top are controllers that are being used to set the angular position of the rotary joints. The rotary joints are in the middle. Finally, at the bottom are the bodies that represent the physical motion for the parts of the device.

Note that the same objects are being used in different structures simultaneously. The object class simply defines different properties to hold the references for different structures. This allows the application engineer to mix and match searches in different structures from the same objects. For example, starting from the convex shape object at the end effector of the robot, one can trace back to rigid body 3 to find the moving part that contains that surface. Following back from that, one can find the hinge B (either from a back pointer or by searching through the limited set of parts in the robot assembly). From hinge B, one can find position controller B in the same way. From that, one can control the position of the end effector's joint. By using a little more search, one can find all the collision shapes in a region or all the kinematic joints and their relative orientation.

Figure 13:
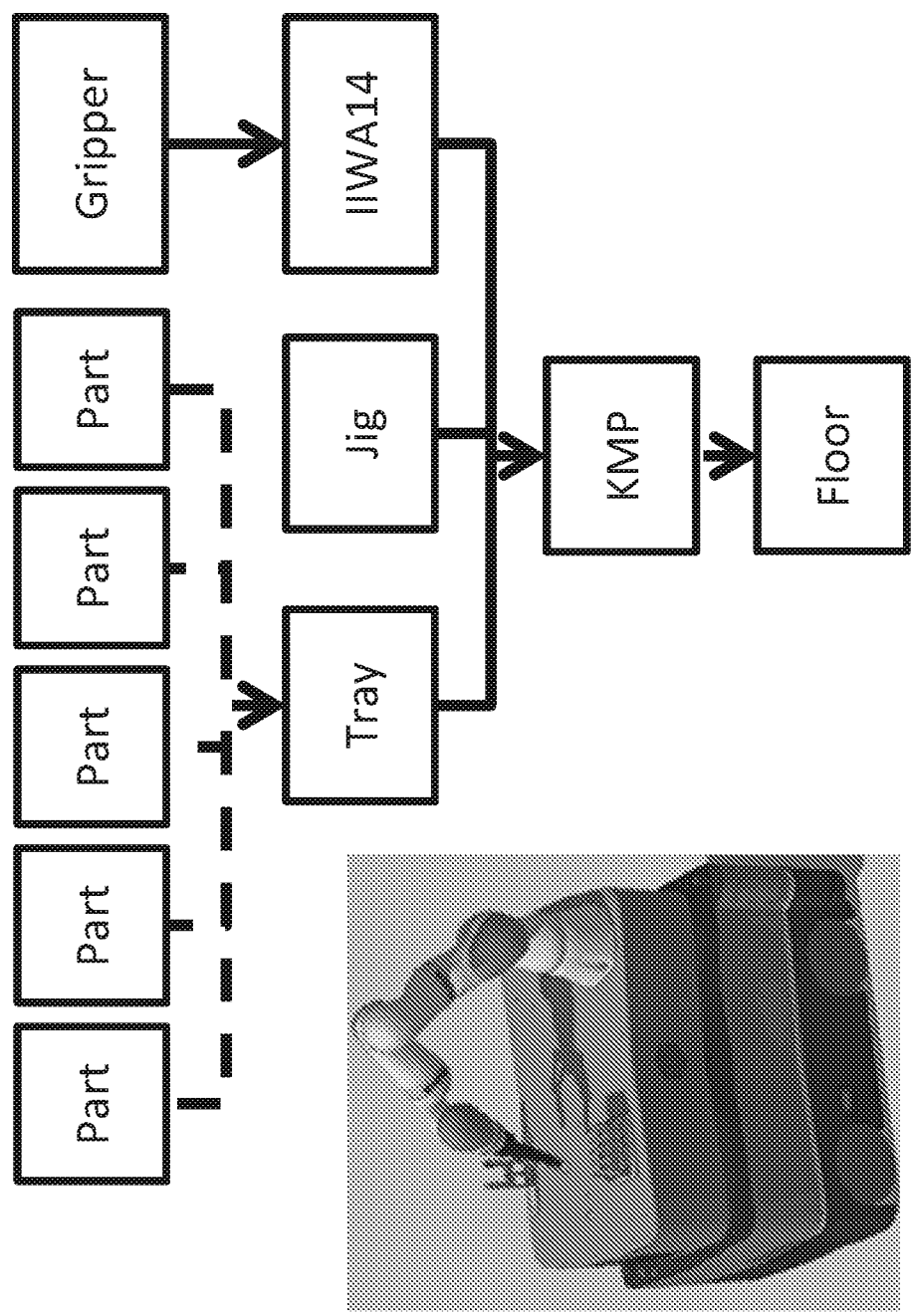
FIG. 13 provides an example attachment hierarchy for a mobile robot platform.

Generally, owner-part and physical connections are created by the component class library writer. A machine builder will, for example, populate the contents of the robot object when it is initialized. The application engineer will also want to be able to attach related parts to one another. A common example is to attach a gripper to the end flange of a robot. In FIG. 13, a set of devices are shown attached to one another. In this case, attachment is directly related to physical contact, as in, the robot arm physically touches the mobile platform in real life. The kind of contact may or may not be important. For the robot and gripper, for example, they are bolted together so that the gripper is physically lifted and moved when the robot arm moves. The mobile platform and the floor, however, are not bolted together. In this case, attachment represents more of an editing convenience. When the user moves the tray, for example, it would be cumbersome if one also had to move each work part that was being held in the tray. So, when the user moves the robot to different locations in the editor, the entirety of attached items will move with it.

Figure 14:
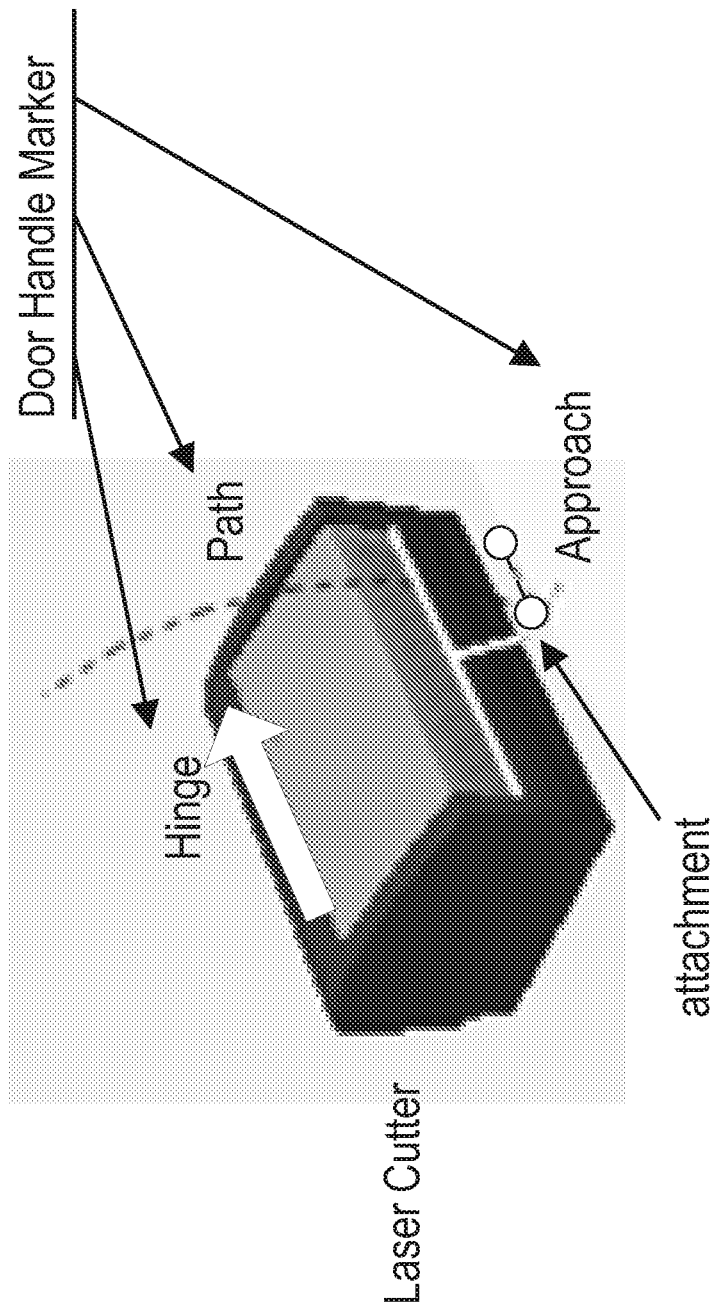
FIG. 14 shows an example of how an attachment can be used to add markers and skills to other components.

The attachment metaphor is used to represent literal contact, but it is also used to represent contextual attachment such as placing a marker or adding a skill. FIG. 14 shows an attachment can be used to add markers and skills to other components, as may be used in some embodiments. In this example, a marker is attached to the handle of a laser cutter's door. The marker, in this case, is represented by graphical dots and lines as well as a white arrow representing the door's hinge. In the model, the marker component is attached to the laser cutter component in the same way a gripper is attached to a robot arm. The same can be applied to other non-physical entities like skills.

FIG. 15 illustrates a track connection graph that may be utilized in some embodiments. The track connection modeling function is similar to the attachment connection technique. The main difference is that whereas an attachment graph forms a hierarchical tree, track connections are bi-directional and equal for both objects being connected. The track forms a general graph rather than a tree. Tracks are good for connecting up actual tracks like the conveyor belt line shown in the image labeled "a" in FIG. 15. They also work nicely for pipes and flow networks as shown in the image labeled "b" in FIG. 15. Thus, track connections may be applied to skills, and various marker configurations could possibly benefit from this connection style.

Controlling and manipulating physical objects is a key factor for an autonomous system. So, for purposes of context, reasoning, and actuation, the physical aspects of the autonomous device's world need to be brought into its knowledge. Some of the definitions for physical objects have already been hinted in prior sections. For simulation and reasoning purposes, the physics are mostly restricted to rigid body motion semantics as well as collision surface detection. Other kinds of physical representations would not be difficult to add. As discussed above, physical properties may be incorporated into components through owner-part aggregation. Adding more kinds of objects to the aggregate is generally possible. In prior projects, fluid flow physics have also been incorporated and has been straightforward to integrate with the components and to work in conjunction with the rigid body physics.

Though it is not strictly necessary to simulate physical objects to make a working application, these objects are especially handy for doing simulation. To make it work, a simulation engine is incorporated into the engineering tool chain. In this project, the simulation engine is a direct part of the engineering tool itself. Converting physics objects in the process objects to objects in the physics engine is usually close to one-to-one. In some embodiments, the runtime objects directly support the creation and management of physics engine objects.

Physical entities are broken down primary by the individual parts that move separately. Unlike product lifecycle management (PLM) data, where parts are separated based on whether they are purchased separately, parts in a component that never come apart are considered the same body. Flexible bodies would be also be feasible but for the current prototypes rigid body motion is only considered. Also, parts that do move separately, like the individual joints in a gripper, must be split into separate bodies. One of the usual first duties when converting PLM computer-aided drafting (CAD) data into a component is joining and separating the graphical entities into the separate parts that need to move. It is common in CAD that parts with moving pieces come frozen in a single graphical model. A gripper might be a single 3D model with no internal structure that would let its fingers move. In another CAD model, parts may be grouped into assemblies by their type. One assembly might be dedicated to nuts and bolts, and another assembly might hold the cabinet flashing. To further complicate the task of the component builder, these problems are usually combined. The assembly for the cabinet might come as a single 3D model where the cabinet door is fused with its door frame.

Figure 16:
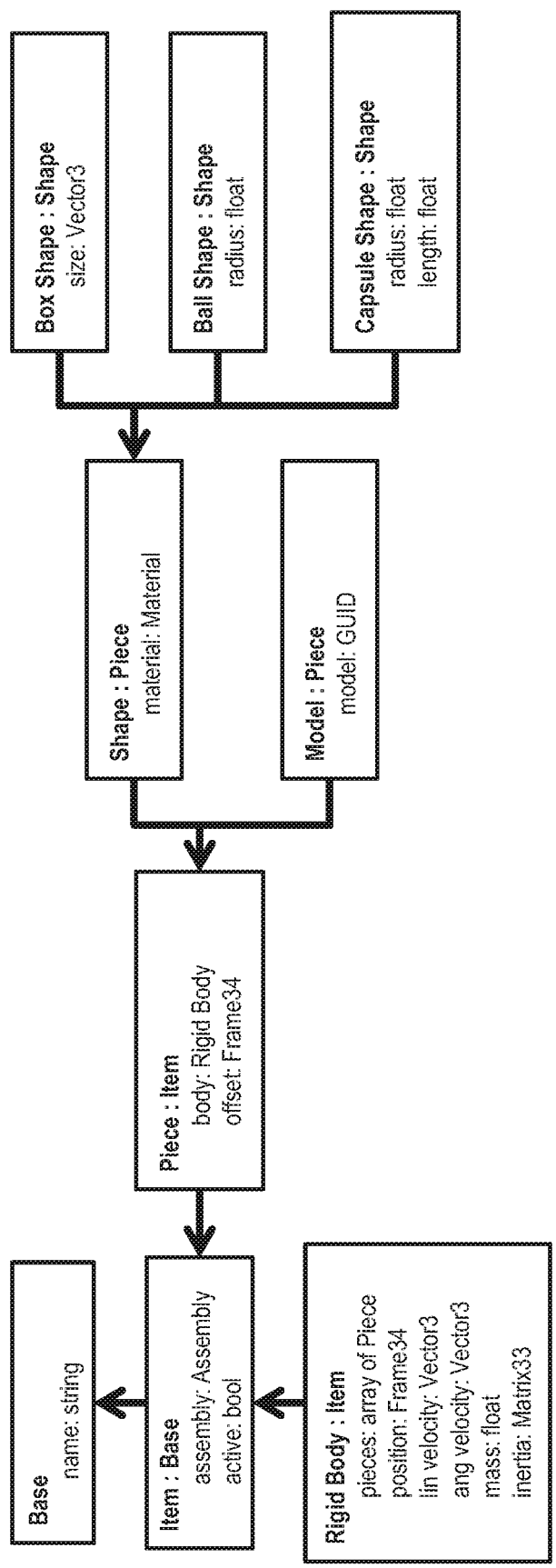
FIG. 16 illustrates classes for basic moving body and surface modeling, according to some embodiments.

The basic body types are broken into Rigid Bodies and Pieces in the engineering tool prototype. FIG. 16 shows classes for basic moving body and surface modeling, as may be used in some embodiments of the present invention. Rigid bodies are things that move and Pieces are things that have shape. Pieces are further divided into models that the user can visualize and Shapes that represent the collision surface of objects. Generally, shapes and 3D models are not represented one-to-one. The complex shape of a component is broken down into a set of simpler types of shapes like boxes and convex polyhedrons. This allows simulation with collision responses to be performed efficiently and also helps to create bounding surfaces for the purpose of planning and collision avoidance. The manner in which a complex shape like a robot is split into collision shapes is shown in FIG. 17. More specifically, FIG. 17 shows multiple surface representations for an object: one for display and the other for collisions. Though the difference may seem obvious when one looks at the result side by side, in fact, when running in simulation, the collision shapes act as perfect stand-ins to the complicated 3D mesh shape.

Figure 18:
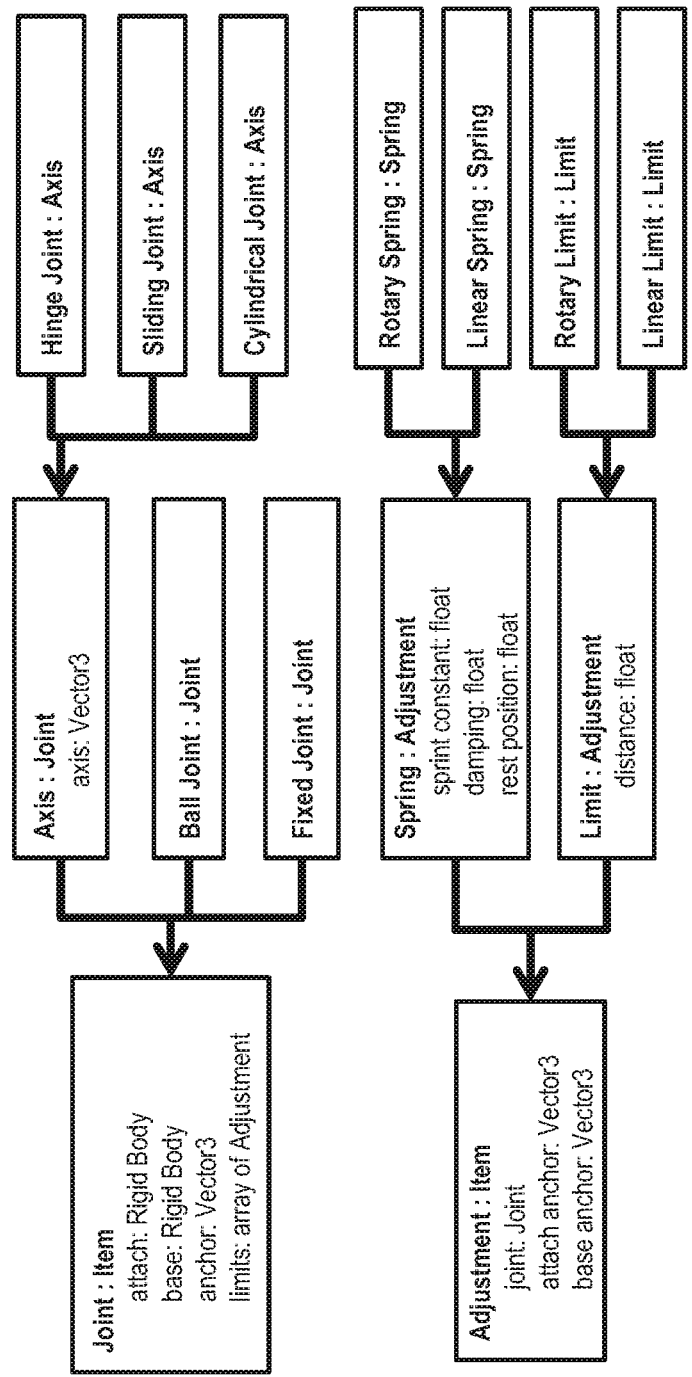
FIG. 18 illustrates a subset of kinematic joints and modifiers supported in the prototype, as may be used in some embodiments.

As previously mentioned, the engineering prototype does not confound kinematics with scene graph semantics. While a scene graph is good for implementing animated poses for movie characters, it lacks the needed flexibility to represent kinematic relationships. FIG. 18 shows a subset of kinematic joints and modifiers supported in the prototype that may be used in some embodiments. In this example, the basic joint classes are listed. Common joints like rotary and linear motions are covered. Note that the inherited class Item is not repeated in this diagram. To see its definition, look back to FIG. 16. To further improve flexibility, joint functions like limits and spring behavior are separated into their own objects. This way joints that are not using additional functional properties are not laden with unused properties.

Joints in this engineering system are not uniform in how they are semantically connected to rigid bodies. In other words, the attach property is not the same as the base property. When a body is set in the attach property, it will be constrained by the joint. If the base body is not set (i.e., null), the joint will constrain the attachment body to the world frame. When the attachment is null and the base is set to a rigid body, the same is not true. Instead, the base may move freely as if it is not attached to the joint at all. Instead, the joint's frame of reference moves with the base body. The attach property can be changed at runtime to connect different bodies to the joint. So, for example, the user may place a fixed joint at the end of a vacuum gripper. The base property of the fixed joint is set with the body of the gripper. When the gripper moves over a part to be picked up, the attach property of the fixed joint is set to the part object. When the gripper moves, the fixed joint is active and picks up the part. When the attach property of the fixed joint is cleared (set to null), the part falls off.

Figure 19:
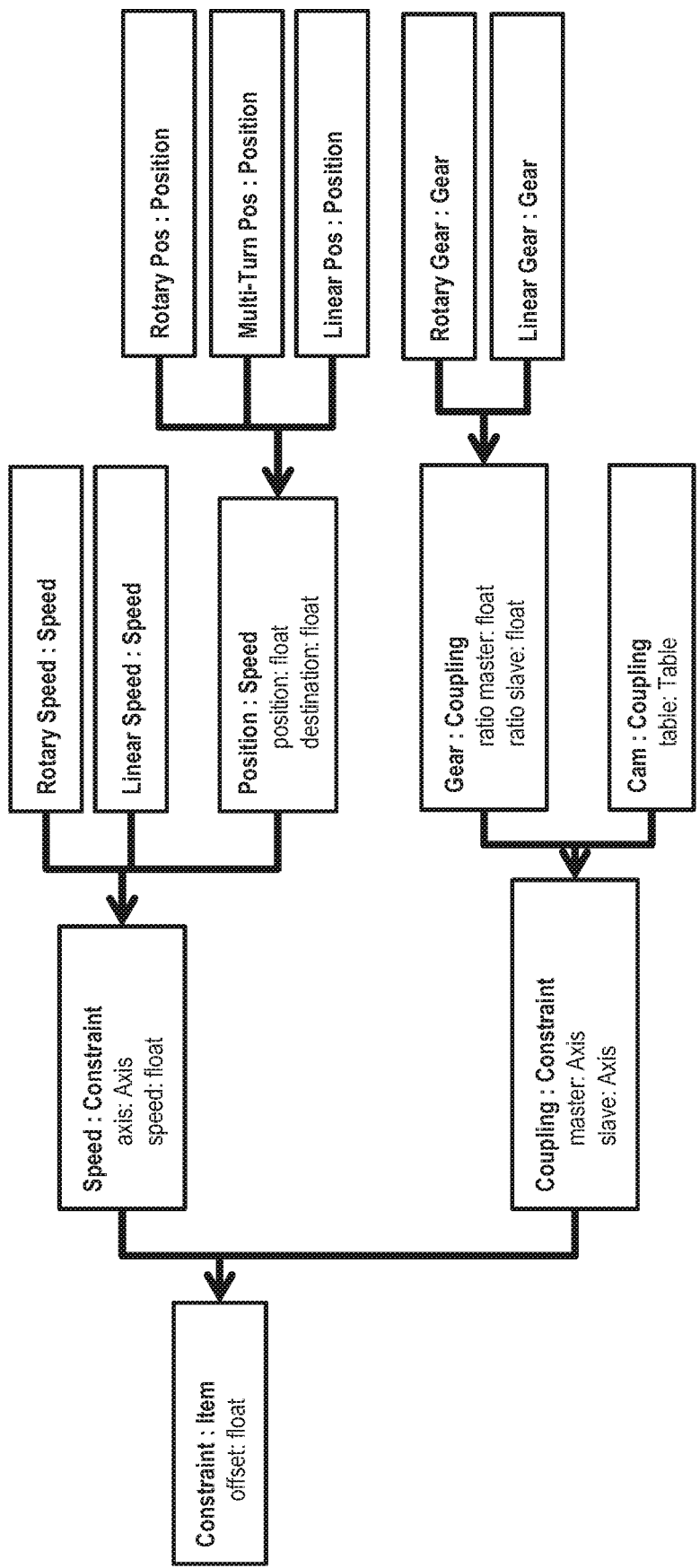
FIG. 19 shows classes for controlling and further constraining joints, as may be used in some embodiments.

For actuators, such as the axes of a robot, being able to control speed and position is essential. To represent joint movement, the prototype provides speed and position controllers. A set of the basic classes for controlling and further constraining joints is shown in FIG. 19. For some model-based engineering methods, representing these kinds of controllers is the sole attribute being modeled. In this case, the controllers are assumed to work because the emphasis is on more abstract relationships like planning and movement. The control object is kept separate from the kinematic joint because not all joints are powered.

At this point, a foundation has been laid from which the objects that represent program semantics can be derived. As can be seen from prior sections, the functional aspect of reusable skills is not the sole principle. The skill concept is in equal parts function and structure. Without knowing the structure of the problem, the function has no meaning or context. A skill represents a way the autonomous system changes its environment. With all the objects described above, the system has a way to describe the environment and can reason how its actions will effect changes.

A skill itself is part function and part structure. The functional aspect of skills is used to control sequencing and timing as well as reserve devices and control activity. The structural aspect of skills is represented by markers within the environmental context and the various devices and work pieces the skill will affect. Markers are created and applied by the application engineer and is a key aspect of the engineering process. Markers are used to create program state and to guide the actions of the skill functions.

Skills and markers are defined by the World Model just like any other object in the system. Just like a machine builder can create a component to represent a particular robot, an algorithm designer can make a component to represent an "Open the Door" skill. The inheritance structure for a skill is different from a robot, but the method of custom implementation is the same. So, just like how a Rigid Body class does not describe how a machine builder makes a conveyor belt, the object classes described here are for generic purposes and do not cover all possible skills.

Figure 20:
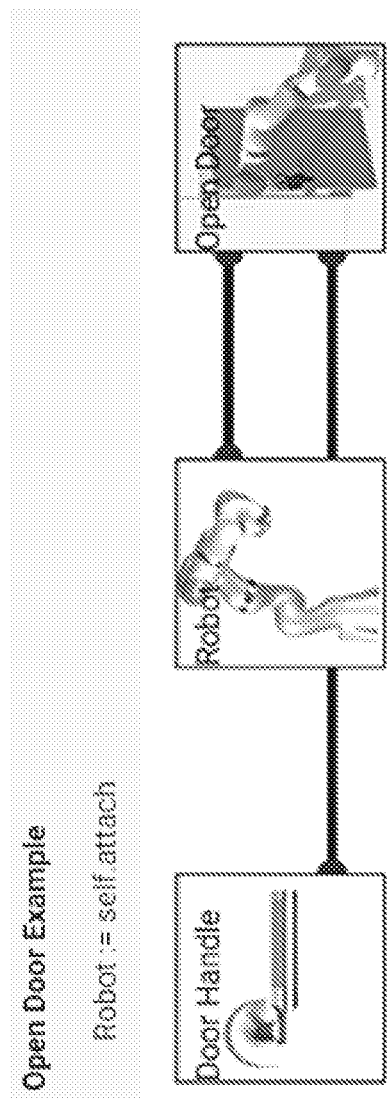
FIG. 20 provides an example of a simple skill function.

The functional aspect of skills works effectively like an imperative language such as a flow chart or sequential function chart (SFC). The operational functions cause changes to occur in the environment and the computational functions compute values and assign the results to local parameters. The manner in which a skill function may be presented is shown in FIG. 20. In this example, a sequential skill block is shown. The sub-skills of the block are presented as boxes with pictures and the computational part of the function is shown as an assignment statement, "Robot:=self.attach". Of the three sub-skills, two are primitive (the reference to the door handle marker and the reference to the "Robot" parameter), and one is component library-defined (the "Open Door" skill).

Figure 21:
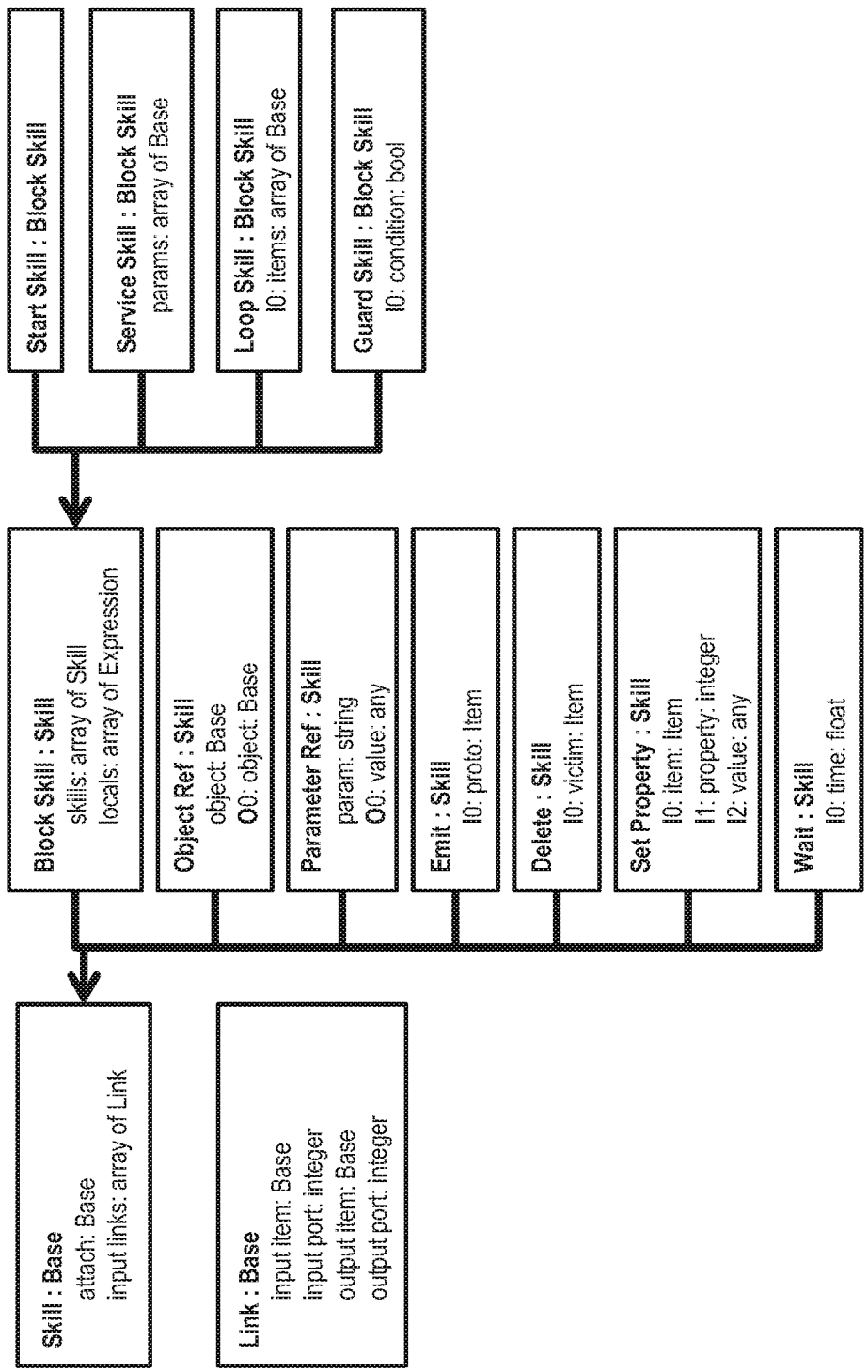
FIG. 21 shows a subset of skill function classes.

FIG. 21 shows the subset of skill function classes. The example skill itself, as well as the three sub-skills, are all considered operational functions. This means that when they run, usually something happens. In most cases, properties of objects in the environment will be changed that, in turn, causes objects to exhibit their behaviors. For example, a robot might start moving, a gripper might grip something, or a conveyor may start running. The wait skill causes idling behavior. The two skills, object and parameter, do not have an external behavior of their own but are used to feed in the objects and values that are needed by other skills to run.

The computational part of the skill function is shown as the text above the picture boxes. These elements are called expressions internally and are represented as World Model process objects just as all other aspects of the engineering tool's application. For expressions, the objects link together to form a syntax tree. Printing out the expression recursively results in the string shown above and parsing the string results in the engineering tool producing the syntax tree of expression objects. A partial Backus-Noir chart is shown in FIG. 22 to indicate what kinds of expressions one might expect the language to be able to handle. To evaluate the expression, a method on the root of the syntax tree's runtime object (that is always a parameter assignment in this case) is called. This recursively calls the remaining parts of the expression until a result is reached.

Although skill computation with expressions is intended to be purely functional (that is it should have no side effects on the rest of the application), a user could use the abstraction to call an internal procedure that does whatever it wants. The expectation is that the developer will use the computational section the way one would use standard programming to compute more complicated expressions. One example would be to call out to planning algorithms to compute paths of motions. Using the expressions one can compute most any kind of data and when ready apply the data to the operational skills to cause the machines to act.

The markers being used as part of skills are not idle tags; they are active pieces of code that investigate the structure of the objects to which they are attached. Markers provide the system the ability to associate new data with the components that is application specific. The markers' ability to run code allows for pervasive state testing and update that does not require an explicit execution of a skill function. This ability also lets markers be an excellent means to trigger functional skill behavior similar to being activated by sensors such as a camera.

Figure 23:
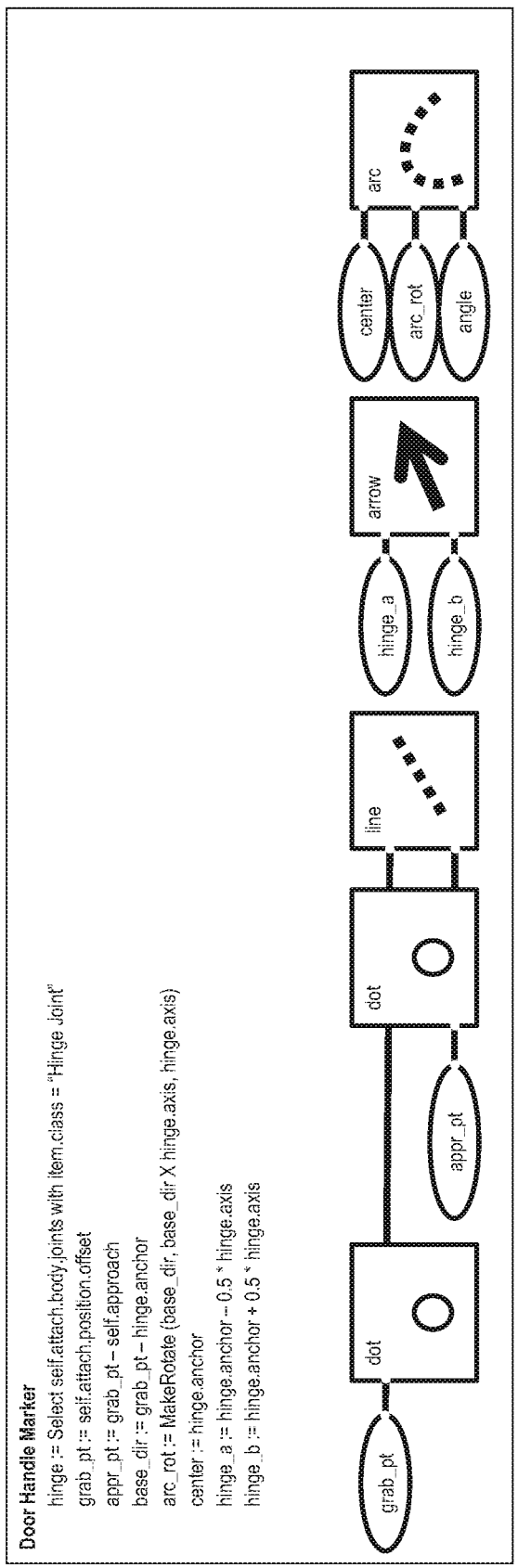
FIG. 23 provides an example for how a door handle marker is created by the application engineer, according to some embodiments.
Figure 24:
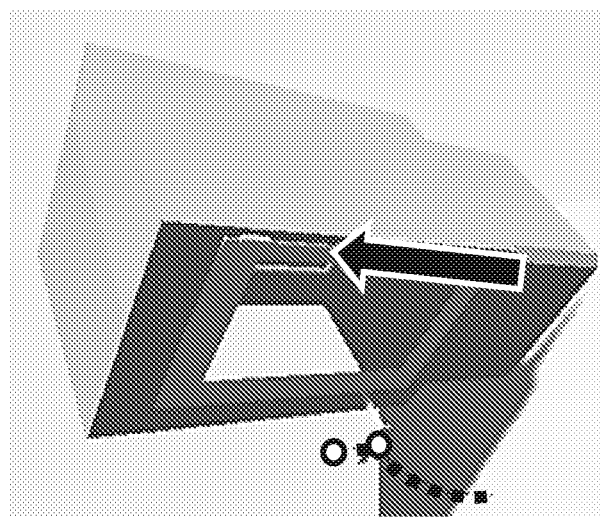
FIG. 24 shows a visualization of a door handle marker, according to some embodiments.

Building a marker can be handled in the same way as building the functional portion of a skill. For the door handle marker that is shown in FIG. 14 and is also shown in FIG. 23 but attached to a different kind of door, the marker can be created from five graphical elements: two dots, a line, an arc, and an arrow. The marker code has the same expression capability that the functional part of the skill can use. The result of running the marker code produces graphical objects in the 3D scene as shown in FIG. 24. From this, the application designer can compute, for example, the positions of the graphical markers used to indicate the salient parts of the door. In the future, one might consider improving this process by adding a graphical constraint editing function.

The code in the door handle refers to itself to find its attachment to the door handle shape. This is aided by the attachment interaction described above. From the shape, the body is retrieved and from the body, the hinge and so on. Selection from a list is used to pick out the hinge from other possible joints. The remaining code is computation of the points where the graphics are placed.

Figure 25:
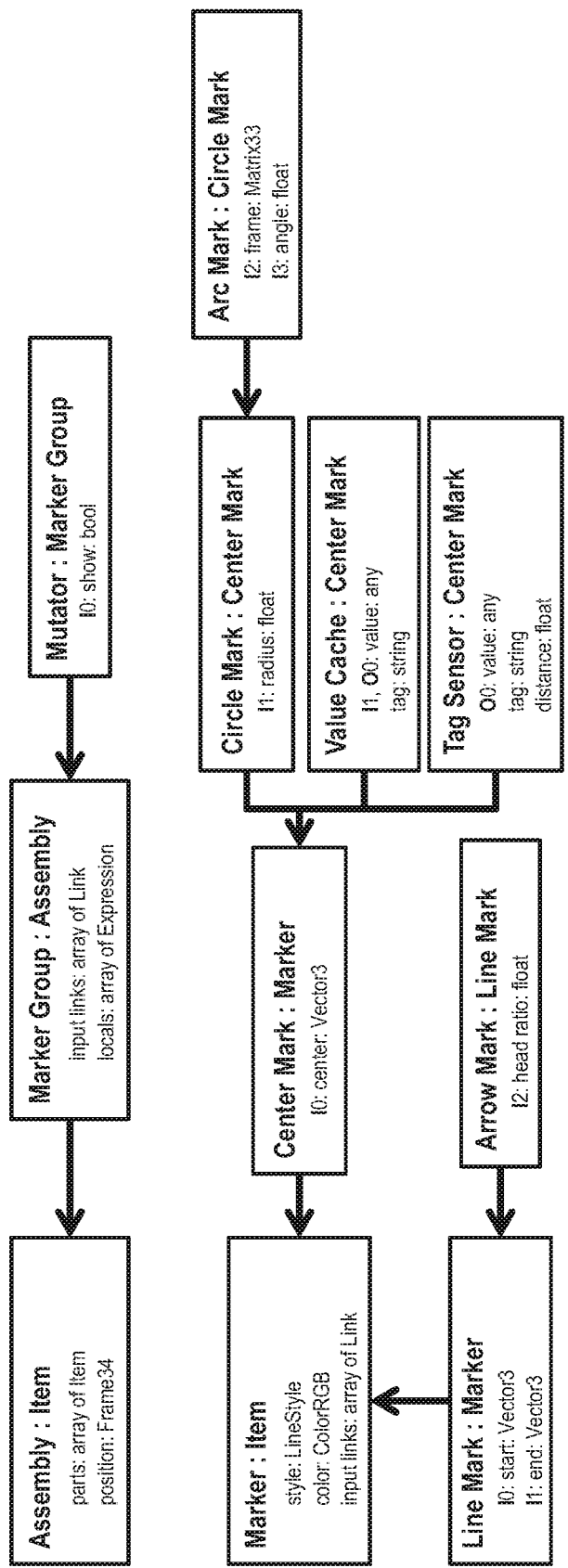
FIG. 25 provides a partial list of classes used for skill markers, according to some embodiments.

The partial set of marker classes for the prototype is shown in FIG. 25. Markers are essentially graphical entities like physical components so they are derived from the Assembly class that is the main grouping object. The marker group adds the properties for expressions and logic dataflow linkages. The Mutator class is a special assembly. In some markers, various sets of graphical elements are optional. For example, in some embodiments, an arrow pointing from where to where a physical device should go and a circle may point out the destination. The mutator acts like a one or nothing emitter that can turn off and on parts as needed.

On the graphical side of the marker classes, one has basic shapes like circles, arcs, and lines. One also has the Value Cache and Tag Sensor classes. These are used to store values and transmit values to different parts of the application. The Value Cache is used to hold a value. For example, the application engineer may want to set a Boolean value on a marker to true when the Computer Numeric Control (CNC) machine has finished milling a part. The Tag Sensor, on the other hand, can find the values stored in Value Cache objects. By marking the cache with a tag name, a sensor with the same name finds the value stored in that cache and brings it to the part of the application where the sensor is a member. For example, a nice use for a tag sensor is to mark a container. The container has the sensor and the work piece has a value marker with the same tag name. When the work piece is stored in the container, the sensor reads its value and marks that storage location as full.

Markers are also especially useful for making applications with emitted objects. For example, a camera component would best be implemented by emitting the objects that it sees as runtime objects into the world model. If the prototypes of the emitted objects have attached markers, the marker structures will be copied along with the other elements of the prototype. This means that the code that went into the marker also gets copied and will run when instance is made. Other skills can search for cached values or other elements of the generated markers. By using that data, the other skills can effectively "see" the objects the camera recognizes and perform activity based on their presence.

The set of classes and objects shown above are extensible through inclusion of added component libraries. Developers may add new functions, new markings, new physical components, as well as new physical models. All features are amenable to search methods within the programming system through attachment hierarchies and generally being able to reference objects from one to another. Other programming systems have fixed sets of fundamental objects and types. Other programming systems eliminate object references such as pointers and only allow data structures to be made of ordinary values.

Figure 26:
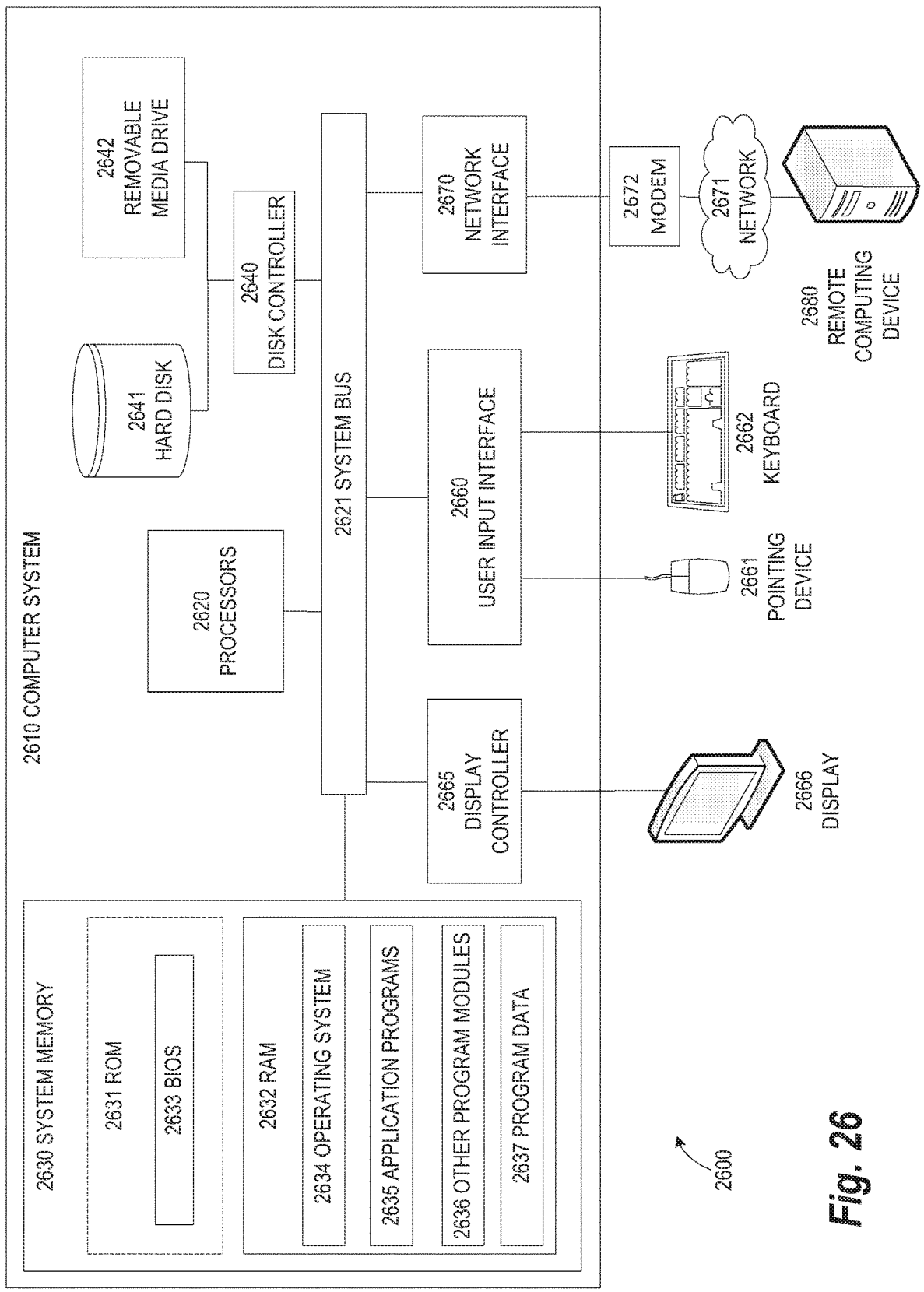
FIG. 26 provides an example computing system, according to some embodiments.

FIG. 26 illustrates an exemplary computing environment 2600 within which embodiments of the invention may be implemented. For example, the computing environment 2600 may be used to display and allow user interaction with the various simulation environments shown in the figures and discussed above. The computing environment 2600 may include computer system 2610, which is one example of a computing system upon which embodiments of the invention may be implemented. Computers and computing environments, such as computer system 2610 and computing environment 2600, are known to those of skill in the art and thus are described briefly here.

As shown in FIG. 26, the computer system 2610 may include a communication mechanism such as a system bus 2621 or other communication mechanism for communicating information within the computer system 2610. The computer system 2610 further includes one or more processors 2620 coupled with the system bus 2621 for processing the information. The processors 2620 may include one or more central processing units (CPUs), graphical processing units (GPUs), or any other processor known in the art.

The computer system 2610 also includes a system memory 2630 coupled to the system bus 2621 for storing information and instructions to be executed by processors 2620. During runtime, a portion of the system memory 2630 may be used for implementing the storage medium 105 shown in FIG. 1. The system memory 2630 may include computer readable storage media in the form of volatile and/or nonvolatile memory, such as read only memory (ROM) 2631 and/or random access memory (RAM) 2632. The system memory RAM 2632 may include other dynamic storage device(s) (e.g., dynamic RAM, static RAM, and synchronous DRAM). The system memory ROM 2631 may include other static storage device(s) (e.g., programmable ROM, erasable PROM, and electrically erasable PROM). In addition, the system memory 2630 may be used for storing temporary variables or other intermediate information during the execution of instructions by the processors 2620. A basic input/output system (BIOS) 2633 containing the basic routines that help to transfer information between elements within computer system 2610, such as during start-up, may be stored in ROM 2631. RAM 2632 may contain data and/or program modules that are immediately accessible to and/or presently being operated on by the processors 2620. System memory 2630 may additionally include, for example, operating system 2634, application programs 2635, other program modules 2636 and program data 2637. For example, the optimization module 115 shown in FIG. 1 may be included in the system memory 2630, either as an application program 2635 or one of the other program modules 2636 executed by the processor(s).

The computer system 2610 also includes a disk controller 2640 coupled to the system bus 2621 to control one or more storage devices for storing information and instructions, such as a hard disk 2641 and a removable media drive 2642 (e.g., floppy disk drive, compact disc drive, tape drive, and/or solid state drive). The storage devices may be added to the computer system 2610 using an appropriate device interface (e.g., a small computer system interface (SCSI), integrated device electronics (IDE), Universal Serial Bus (USB), or FireWire).

The computer system 2610 may also include a display controller 2665 coupled to the system bus 2621 to control a display 2666, such as a cathode ray tube (CRT) or liquid crystal display (LCD), for displaying information to a computer user. The computer system includes a user input interface 2660 and one or more input devices, such as a keyboard 2662 and a pointing device 2661, for interacting with a computer user and providing information to the processors 2620. The pointing device 2661, for example, may be a mouse, a trackball, or a pointing stick for communicating direction information and command selections to the processors 2620 and for controlling cursor movement on the display 2666. The display 2666 may provide a touch screen interface which allows input to supplement or replace the communication of direction information and command selections by the pointing device 2661.

The computer system 2610 may perform a portion or all of the processing steps of embodiments of the invention in response to the processors 2620 executing one or more sequences of one or more instructions contained in a memory, such as the system memory 2630. Such instructions may be read into the system memory 2630 from another computer readable medium, such as a hard disk 2641 or a removable media drive 2642. The hard disk 2641 may contain one or more datastores and data files used by embodiments of the present invention. Datastore contents and data files may be encrypted to improve security. The processors 2620 may also be employed in a multi-processing arrangement to execute the one or more sequences of instructions contained in system memory 2630. In alternative embodiments, hard-wired circuitry may be used in place of or in combination with software instructions. Thus, embodiments are not limited to any specific combination of hardware circuitry and software.

As stated above, the computer system 2610 may include at least one computer readable medium or memory for holding instructions programmed according to embodiments of the invention and for containing data structures, tables, records, or other data described herein. The term "computer readable medium" as used herein refers to any medium that participates in providing instructions to the processors 2620 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 2641 or removable media drive 2642. Non-limiting examples of volatile media include dynamic memory, such as system memory 2630. Non-limiting examples of transmission media include coaxial cables, copper wire, and fiber optics, including the wires that make up the system bus 2621. Transmission media may also take the form of acoustic or light waves, such as those generated during radio wave and infrared data communications.

The computing environment 2600 may further include the computer system 2610 operating in a networked environment using logical connections to one or more remote computers, such as remote computing device 2680. Remote computing device 2680 may be a personal computer (laptop or desktop), a mobile device, a server, a router, a network PC, a peer device or other common network node, and typically includes many or all of the elements described above relative to computer system 2610. When used in a networking environment, computer system 2610 may include modem 2672 for establishing communications over a network 2671, such as the Internet. Modem 2672 may be connected to system bus 2621 via user network interface 2670, or via another appropriate mechanism.

Network 2671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 2610 and other computers (e.g., remote computer 2680). The network 2671 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 2671.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

I claim:

1. A computer-implemented method of engineering an autonomous system with reusable skills related to a manufacturing process, the method comprising:
    displaying a graphical user interface simulating a physical environment, wherein the graphical user interface depicts one or more simulated objects corresponding to one or more physical objects;
    creating one or more graphical markers on the one or more simulated objects based on instructions provided by a user via the graphical user interface wherein at least one of the graphical markers includes (i) a value cache for storing values related to the manufacturing process and labeled with a searchable tag, and (ii) a tag sensor configured to find values stored in value cache objects by searching for the searchable tags;
    determining position and orientation of each graphical marker with respect to the one or more simulated objects;
    creating a skill function comprising a functional description for using a controllable physical device to interact with the one or more physical objects based on the position and orientation of each graphical marker;
    generating executable code operable to perform the skill function; and
    actuating the controllable physical device using the executable code;
    generating a plurality of process objects comprising (i) one or more process objects corresponding to the physical objects; (ii) one or more process objects corresponding to the controllable physical device; (iii) one or more process objects corresponding to the graphical markers; and (iv) one or more process objects corresponding to the skill function.

2. The method of claim 1, wherein the process objects are used as prototypes for a plurality of runtime objects and the executable code is derived from the runtime objects.

3. The method of claim 1, wherein (i) the one or more process objects are organized in an attachment hierarchy based on physical attachment and (ii) the executable code traverses the attachment hierarchy to actuate the controllable physical device.

4. The method of claim 1, wherein the physical device is a robotic arm.

5. The method of claim 4, wherein position information from at least a portion of the graphical markers is used to calibrate the robotic arm to the physical environment.

6. The method of claim 4, wherein at least a portion of the graphical markers comprise touch markers indicating where the physical device should touch a particular physical object during execution of one or more of the skill functions.

7. The method of claim 4, wherein at least one physical object corresponds to a handle and at least one of the graphical markers corresponds to a position for actuating the handle using the physical device during execution of one or more skill functions.

8. The method of claim 1, wherein at least one of the graphical markers comprises an arrow indicating direction of travel for the physical device during execution of one or more skill functions.

9. The method of claim 8, wherein at least one of the graphical markers comprises a circle indicating a destination of the physical device following movement during execution of one or more skill functions.

10. The method of claim 1, further comprising:
activating a skill function as part of a device service, wherein the skill function comprises one or more functional steps to be performed on a physical object in a physical environment;
collecting structural information from the physical environment;
identifying the physical object based on the structural information;
retrieving one or more markers corresponding to the physical object from a database of pre-generated markers;
using a physical device to perform the one or more functional steps on the physical object using the one or more markers.

11. The method of claim 10, wherein the structural information comprises a physical location associated each physical object in the physical environment.

12. The method of claim 11, wherein the structural information further comprises indications of physical attachments between each physical object in the physical environment.

13. The method of claim 10, wherein the one or more markers corresponding to the physical object are generated using a simulation environment that simulates the physical environment.

14. The method of claim 1,
wherein (i) the one or more process objects corresponding to the controllable physical device comprise a device object and a plurality of sub-objects organized in an owner part hierarchy and (ii) the executable code traverses the owner part hierarchy to actuate the controllable physical device; and
wherein (i) the device object and the plurality of sub-objects are linked using connections corresponding to kinematic function and (ii) the executable code uses the connections to actuate the controllable physical device.

* * * * *